United States Patent [19]
Ditcher

[11] Patent Number: 4,801,417
[45] Date of Patent: Jan. 31, 1989

[54] METHODS FOR FORMING INVERTS IN MANHOLD ASSEMBLIES

[75] Inventor: Jack Ditcher, Tullytown, Pa.
[73] Assignee: A-LOK Products Corporation, Tullytown, Pa.

[21] Appl. No.: 54,267
[22] Filed: May 26, 1987

Related U.S. Application Data

[60] Division of Ser. No. 716,353, Mar. 26, 1985, Pat. No. 4,685,650, which is a continuation-in-part of Ser. No. 513,696, Jul. 14, 1983, abandoned, which is a division of Ser. No. 234,639, Feb. 17, 1981, Pat. No. 4,422,994.

[51] Int. Cl.⁴ .......................... B28B 1/16; B29C 39/10
[52] U.S. Cl. ...................................... 264/250; 264/32; 264/35; 264/256; 264/267; 264/277; 264/333
[58] Field of Search .................... 264/333; 249/11, 83, 249/145, 146, 150, 155, 159, 177, 183, 184, 10, 142, 144, 147, 149, 151, 153, 179, 32, 35, 250, 256, 267, 277

[56] References Cited

U.S. PATENT DOCUMENTS

| | | | |
|---|---|---|---|
| 2,234,784 | 3/1941 | Stolz | 249/183 X |
| 2,366,401 | 1/1945 | Haskell | 249/177 X |
| 3,363,876 | 1/1968 | Moore | 249/145 |
| 3,415,482 | 12/1968 | Schmidgall | 249/145 |
| 3,758,066 | 9/1973 | Skinner et al. | 249/95 |
| 3,815,214 | 6/1974 | Kyle, Sr. | 249/11 X |
| 4,103,862 | 8/1978 | Moore | 249/145 X |
| 4,119,291 | 10/1978 | Polito | 249/11 |
| 4,143,849 | 3/1979 | Good | 249/11 |
| 4,177,229 | 12/1979 | Moore | 249/145 X |
| 4,278,229 | 7/1981 | Burlett | 249/11 |
| 4,318,880 | 3/1982 | McIntosh et al. | 249/145 X |
| 4,422,994 | 12/1983 | Ditcher | 264/219 |
| 4,427,619 | 1/1984 | Peterson | 249/145 X |
| 4,565,347 | 1/1986 | Ditcher | 249/11 X |
| 4,685,650 | 8/1987 | Ditcher | 249/83 |

*Primary Examiner*—Jan H. Silbaugh
*Assistant Examiner*—Karen D. Kutach
*Attorney, Agent, or Firm*—Louis Weinstein

[57] ABSTRACT

In a method for forming inverts in a manhole base using a two pour technique, the manhole base is initially formed. Thereafter, channel invert forms are aligned with sidewall openings by alignment members arranged within the manhole openings to assure precise alignment therebetween, wherein the invert formed within the manhole base by pouring the casting material into the base member is in precise alignment with associated sidewall openings. The apparatus for the two pour technique incorporates at least one adjustably positionable channel-forming assembly for forming an invert communicating between associated sidewall openings each having a central axis and whose intersecting central axes define an angle different from 180°. In one arrangement, flexible members join the ends of the invert form. Alignment members on the inverts and a flexible internal member, either alone, or in cooperation with a joining bar and clamp, assure precise alignment between the channel-shaped projections forming the invert and prevent flotation of the invert form during casting.

16 Claims, 13 Drawing Sheets

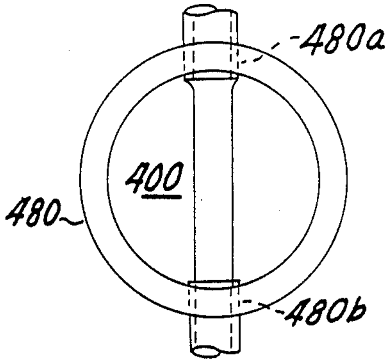
FIG.19a
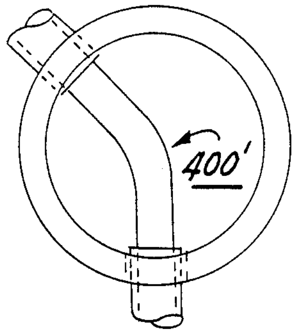
FIG.19b
FIG.19c
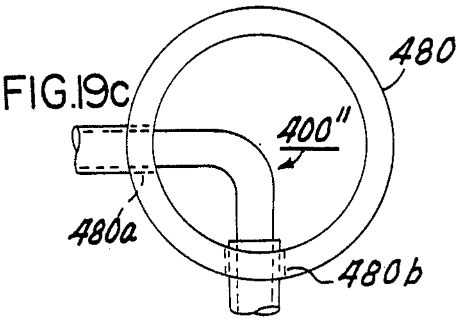
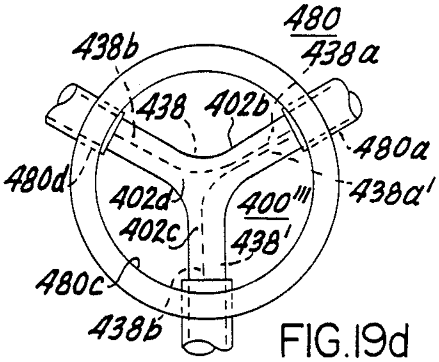
FIG.19d
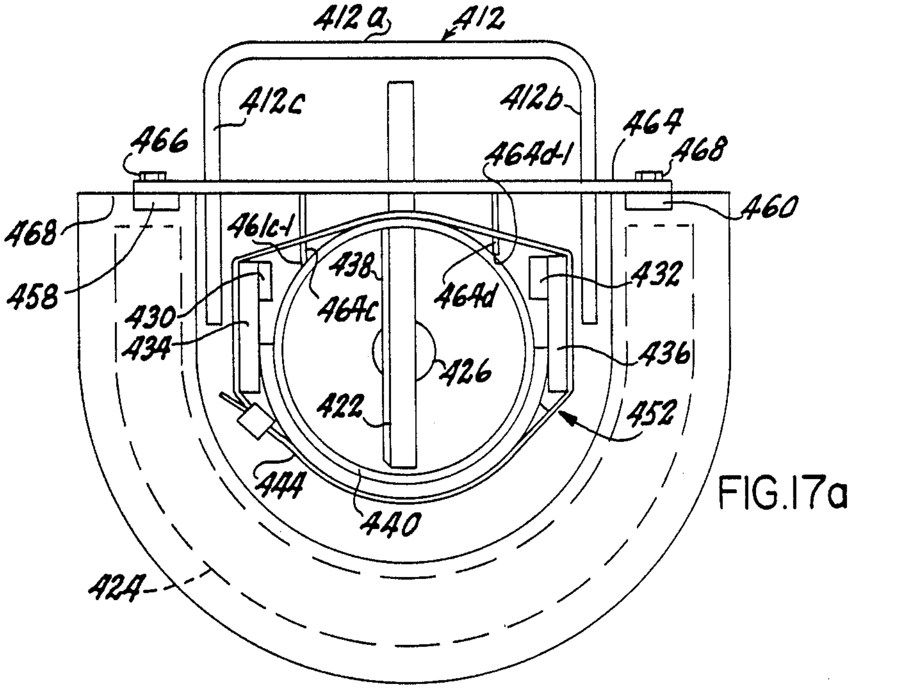
FIG.17a

METHODS FOR FORMING INVERTS IN MANHOLD ASSEMBLIES

This is a division of application Ser. No. 716,353 filed Mar. 26, 1985, now U.S. Pat. No. 4,685,650, which is a continuation-in-part of application Ser. No. 513,696, filed July 14, 1983, now abandoned, which is a division of application Ser. No. 234,639, filed Feb. 17, 1981, now U.S. Pat. No. 4,422,994.

FIELD OF THE INVENTION

The present invention relates to manhole assemblies and the like and more particularly to novel method and apparatus for forming inverts in manhole assemblies through either a single pour or a two pour technique, wherein the inverts formed thereby are in precise alignment with the sidewall openings of the manhole assembly base member.

BACKGROUND OF THE INVENTION

Manhole assemblies are typically comprised of a manhole base, an intermediate or riser section and top section normally designed to receive the manhole cover. The base section is comprised of a substantially flat base portion and a cylindrical shaped sidewall extending upwardly therefrom and integral therewith. Openings are arranged in the sidewall, each being adapted to receive the end of a pipe for selectively introducing a liquid flow into the invert or removing a liquid flow therefrom. Manhole assemblies are provided whenever a change in slope or angular orientation is encountered from one pipe run to the next. The openings receiving said pipe are arranged in accordance with the pipe runs connected thereto, the invert extending between the side-wall openings may, for example, define a straight line, right angle configuration, or a Y-configuration (in the case of a base member having three openings designed for merging two incoming pipe runs and feeding the combined flow therefrom to a single outgoing pipe run). It is extremely advantageous to maintain a smooth flow through the invert of the base member, thence turbulence resulting from misalignment of the invert relative to the incoming and outgoing pipes significantly increases the development of odious and toxic gases as a result of such turbulent conditions. In addition, a smooth fluid flow also serves to maximize flow rate through the manhole base.

Heretofore, manhole bases have typically been formed in two stages, the manhole base absent the invert being formed at the factory and the invert being formed at the job site after positioning the manhole base in the ground, usually five (5) to fifteen (15) feet below surface. Usually at least one or more workmen descend into the manhole base and set up the channel forming assemblies. The casting material, typically concrete, is also transported to the job site and dropped into the base member from ground level through the manhole assembly and into the bottom of the manhole base, dropping a distance of the order of 15 feet or more before reaching the floor of the manhole base. The workmen encounter cramped working conditions within the manhole assembly and are constrained to stand upon the channel forming apparatus during the time that the casting material is being poured, and while the casting material is setting. the workmen must also support themselves upon the channel forming apparatus in order to form the sloping surfaces in the interior of the manhole base adjacent to the invert being formed. The nature of the method steps necessary for forming an invert in accordance with the abovementioned conventional technique in the manhole assembly base member is such that the operation is tedious, complex and time-consuming and also fails to provide accurate alignment between the invert and the sidewall openings to assure smooth flow through the manhole base and to maximize the flow rate through the manhole base.

BRIEF DESCRIPTION OF THE INVENTION

The present invention is characterized by comprising method and apparatus for forming an invert in a manhole base of a manhole assembly and which is designed to permit the manhole base to be completely, simply and rapidly formed at the factory through the use of either a single pour or double pour technique.

The single pour technique is preferably utilized to form inverts of the most typically used designs, thereby lending itself to mass production techniques. Base members are formed using the single pour method by employing mold members which form and define the base and sidewall of the manhole base. Ring-shaped gasket holder assemblies are arranged within the aforesaid mold members to form and define the openings in the manhole base sidewall into which the gaskets held thereby are integrally cast. The manhole base is cast in an "upside-down" fashion. The mold member forming part of the mold assembly is provided with a channel shaped projection for forming and defining the invert and is provided with flange portions each defining a recess arranged between the outer end of the invert and its associated sidewall opening, which recesses facilitate insertion of a connecting pipe. The mold member having the channel shaped projection is provided with reciprocally movable registration pins insertable into associated locater openings provided in the ring shaped gasket supports so that, when the aforesaid mold member is in position and the registration pins are inserted into their associated locater holes, precise alignment, of the invert with the associated sidewall openings is thereby assured. The casting material is then poured into the molding apparatus.

When the case member has set, the mold members, including the mold member utilized to form the invert, are separated from the cast member. The registration pins are withdrawn from the locater openings to facilitate removal of the invert forming mold member. The ring-shaped gasket holders are likewise disassembled and removed, thereby forming a manhole base having sidewall openings integrally formed with pipe sealing gaskets and having an invert whose longitudinal axis is precisely in coaxial alignment with the central axis of the adjacent side wall opening. The recesses arranged between the outer ends of the invert and the adjacent side wall opening provide for either misalignment of a pipe extending therethrough to facilitate insertion of a pipe as well as allowing for misalignment of the pipe relative to the longitudinal axis of the invert which may, for example, occur due to settling of the earth about the manhole assembly, as well as other natural phenomena. The gaskets provide a n excellent water-tight seal between the pipe and the manhole base sidewall, once the pipe is inserted while at the same time being sufficiently resilient to facilitate simple and yet rapid initial insertion of the pipe end.

The most widely used manhole base is comprised of a linear invert which is coaxial with an imaginary diameter of the base member, and as a result, it is practical to produce a mold member which defines the aforesaid invert due to the large number of base members normally produced through the use of such a mold member. However, a significant number of base members frequently require inverts extending between openings which are arranged to be in alignment with imaginary radii which cooperatively form an angle of other than 180°. It is thus cost-prohibitive to produce a mold member which defines an invert for each such invert configuration. As a result, the present invention further incorporates a mold member having a main body portion and a first channel-forming projection integrally formed on the main body portion and a movable channel-forming projection which is releasably secured to the main body portion. A flexible connector extends between the integral and movable channel-forming projections. Reciprocating registration pins, as were described hereinabove, are provided in the mold member and are arranged to be extended radially outward for insertion into locater openings in the gasket supporting rings to assure precise alignment between the channel-forming projections and the sidewall openings in the manhole base. The movable member of the channel forming mold member may be oriented at any desired angle relative to the integral channel-forming member over a range from 90° to 270°, for example, thereby enabling the formation of a wide variety of base members having two side wall openings. Automatically operable suction means is arranged within the movable channel-forming member to releasably secure the movable member to the main body portion, the vacuum condition being releasable upon completion of the casting and setting of the manhole base. Pneumatic means may also be provided as shown in one preferred embodiment, for operating the registration pins in a reciprocating manner.

The present invention further teaches method and apparatus fro forming inverts in manhole assembly base members utilizing a two-pour technique in which the manhole assembly base is formed and cast in a first pour wherein the sidewall openings each have an integrally mounted gaskets and wherein a flat interior floor is formed in the base member during said first pour. Thereafter, two or more channel-forming projection members and cooperating alignment rings are inserted into the manhole assembly base member and the alignment rings cooperating with clamping members secure the channel-forming members to the base member at each sidewall opening and assure precise axial alignment between each sidewall opening and its associated channel-forming member. Once the channel-forming members are so mounted, they are generally axially aligned along imaginary radii of the manhole assembly base member. Each channel-forming member is provided with a planar top surface having an upwardly extending elongated projection. Clamping bars are provided to clamp the inwardly directed ends of the channel-forming members to one another to assure precise angular alignment therebetween and further to assure alignment of the channel-forming members so that their longitudinal axes lie in a common imaginary plane. The clamping bars may be comprised of a pair of operating clamping members arranged so that the first ends of the clamping bars cooperate with fastening means to arrange the clamping bar members at any desired angle therein. The clamping members, once arranged to obtain the desired angle, are then clamped to projections on respective ones of the channel-forming members for securement thereto, whereupon the "second-pour" of the casting operation is then initiated, the casting material being poured into the interior of the manhole assembly based member and about the channel-forming members. After the casting material is poured, but before it is set, the operators slope the floor of the base member on opposite sides of the invert. Once the casting material is set, the channel-forming projections and clamping members may then be removed, completing the two pour operation.

The two pour operation is ideal for use in forming manhole assembly base members having two or more openings and cooperating inverts. In manhole bases in which at least two sidewall openings are provided, the channel-forming members for forming two of the invert portions are preferably joined with an intermediate flexible member, as was described hereinabove. The two pour method is especially advantageous for use in forming inverts in manhole assembly bases having one or more sidewall openings, especially three such openings, the channel-forming members being adapted to be arranged at any desired angle to thereby form associated invert portions which are in precise axial alignment with their adjacent sidewall openings to assure smooth, non-turbulent flow through the base member.

Another preferred embodiment of the present invention comprises a resilient, flexible shell defining first and second channel-forming assemblies joined together by a flexible duct enclosed within the resilient flexible shell. The opposite ends of the flexible duct are respectively joined to first and second internal supporting structures. A flexible leaf spring extends through the flexible duct to permit flexing in a horizontal plane while preventing flexing in the vertical plane.

Anti-flotation bars extend over a portion of the top surface of said resilient, flexible shell and prevent the flotation of the invert form due to the casting material pouring into the manhole base. The anti-flotation bars are adjustable to permit angular orientation of the invert form within the manhole base for forming a sloping invert. The leaf spring cooperates with the anti-flotation bars to prevent flotation and to assure the formation of an invert having a perfectly linear slope from the higher sidewall opening to the lower sidewall opening (or openings).

The resilient, flexible invert is formed by placing the internal supporting structures and flexible duct into a mold having a predetermined contour, typically for forming an invert of a nominal angle of 180°, 135° or 90° and pouring the material used to form the shell into the mold so that the material covers the flexible duct and substantially covers the internal supporting structures. An anti-flotation bracket is used to prevent flotation of the flexible duct when the shell forming material is poured into the mold. The completed invert retains its nominal contour and is sufficiently flexible to be deflected to any angle within the range of the order of 20° to 35° from its nominal contour. A flexible leaf spring member extending the flexible duct enhances the resiliency of the invert form.

The flexible duct significantly reduces the amount of material required to form the shell and hence significantly reduces the weight of the invert form. The flexible duct assures the formation of a shell having a thickness which is controlled to prevent creasing or folding of the shell along the inside curve and to prevent creasing or permanent deformation of the shell.

The flexible resilient invert form can be used for the single-pour, as well as the two pour methods. The two pour method has been described hereinabove. The single pour method comprises the step of securing one of the internal supporting structures to the body member of the single pour molding apparatus, as will be more fully described.

OBJECTS OF THE INVENTION AND BRIEF DESCRIPTION OF THE FIGURES

It is, therefore, one object of the present invention to provide novel method and apparatus for forming manhole assembly bases having an invert which is in precise alignment with the associated sidewall openings.

Still another object of the present invention is to provide novel method and apparatus for forming inverts in manhole assembly bases which include means for simply and yet precisely aligning the invert forming apparatus with the associated sidewall openings.

Still another object of th e present invention is to provide novel apparatus for forming inverts in manhole assembly bases in which the channel-forming members provided to form and define the inverts may be arranged at any desired angle and yet precisely aligned with the associated sidewall openings.

Still another object of th e present invention is to provide apparatus for forming inverts in manhole assembly bases and the like in which the channel-forming members forming said invert are joined by a flexible coupling means.

Still another object of the present invention is to provide a manhole base provided with recesses arranged between each sidewall opening having a sealing gasket and the adjacent end of an invert for facilitating insertion of a pipe in sealing relation.

Another object of the present invention is to provide a resilient, flexible invert form for producing inverts and being sufficiently resilient and flexible to enable deflection of the invert form from its nominal contour to enable formation of inverts over a wide range of contours.

Another object of the invention is to provide a flexible, resilient invert form of the character described and having anti-flotation bars to prevent flotation of the invert form due to the casting material.

The above, as well as other objects of the present invention, will become apparent when reading the accompanying description of the drawings in which:

FIG. 1 is an exploded perspective view of the molding apparatus employed for forming a manhole assembly base member in accordance with the single pour technique.

FIG. 1*a* shows a perspective view of the channel-forming member showing the gasket supporting rings, inner cylindrical mold member and wire frame of FIG. 1 assembled upon the bottom plate.

FIGS. 2*a* and 2*b* show perspective views of the top and bottom sides respectively of the channel-forming member of FIG. 1*a*.

FIG. 2*c* shows a sectional view of a portion of the channel-forming member looking in the direction of arrows 2*c*—2*c* in FIG. 2*a*.

FIG. 3*a* shows a top plan view of a manhole assembly base member formed through the use of the single pour technique and employing the apparatus of FIG. 1.

FIG. 3*b* shows a perspective view of the manhole assembly base member of FIG. 3*a* with a portion thereof being removed for purposes of exposing the interior construction.

FIG. 3*c* shows a sectional view of one of the sidewall openings of FIG. 3*b* looking in the direction of arrows 3*c*—3*c*.

FIG. 3*d* shows a top plan view of still another manhole base.

Figure 6A:
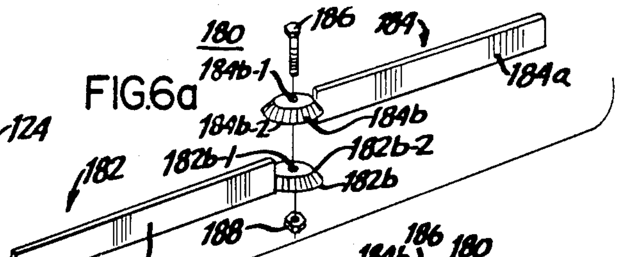
FIG. 6 is an exploded perspective view of the apparatus employed for forming a portion of the invert in the base member of FIG. 5.
Figure 6B:
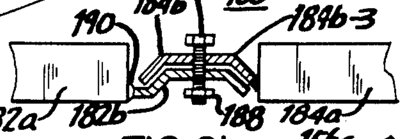
Figure 6:
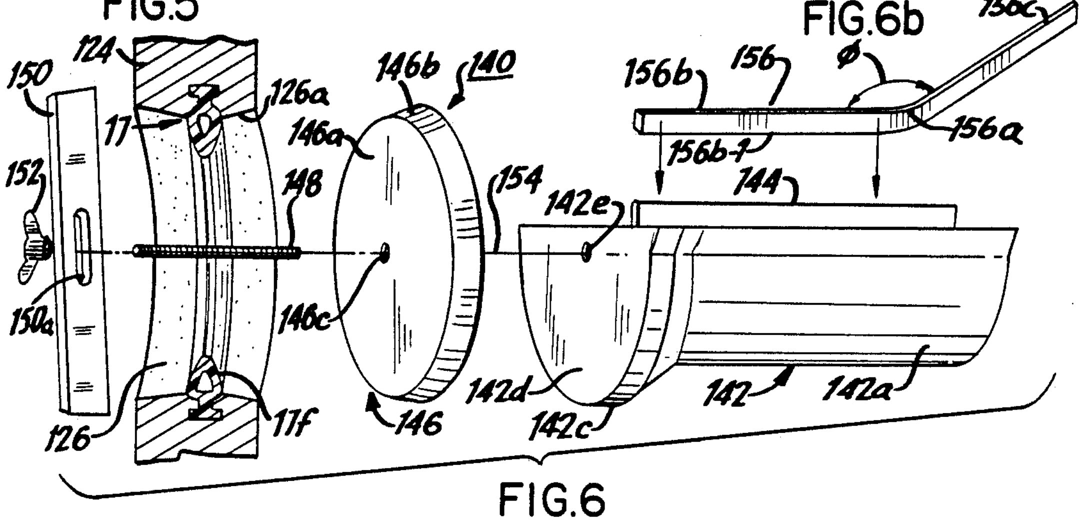

FIG. 6*a* shows an exploded perspective view of an alternative clamping bar assembly which may be employed in place of the clamping bar shown in FIG. 6.

FIG. 6*b* shows a sectional view of the adjustable portion of the clamping bar assembly of FIG. 6*a*.

Figure 7A:
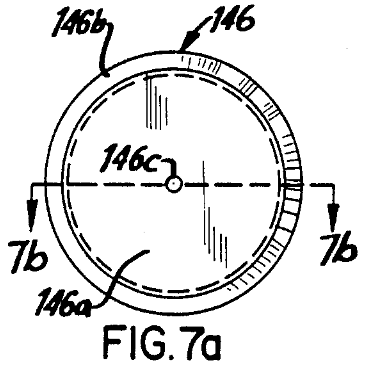
Figure 7B:
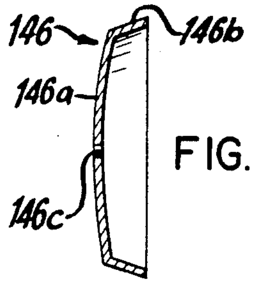

FIGS. 7*a* and 7*b* are front and sectional views respectively of the positioning ring of FIG. 6.

Figure 8A:
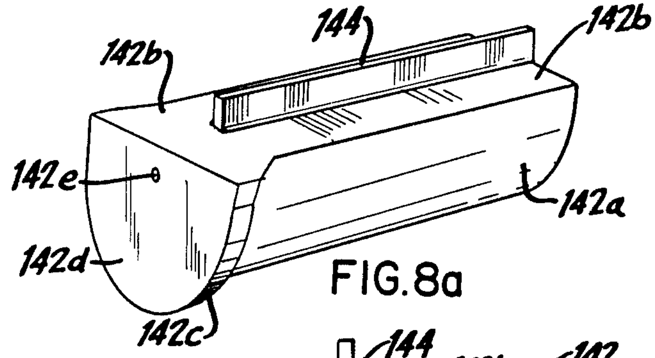
Figure 8B:
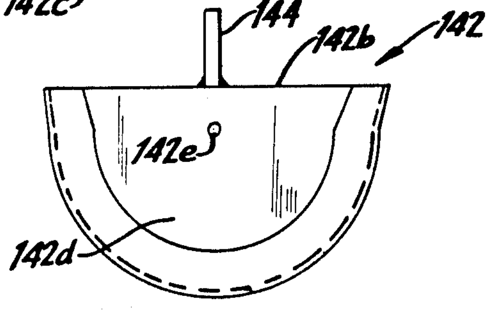

FIGS. 8*a* and 8*b* are perspective and front elevational views respectively of the channel-forming member of FIG. 6.

Figure 9:
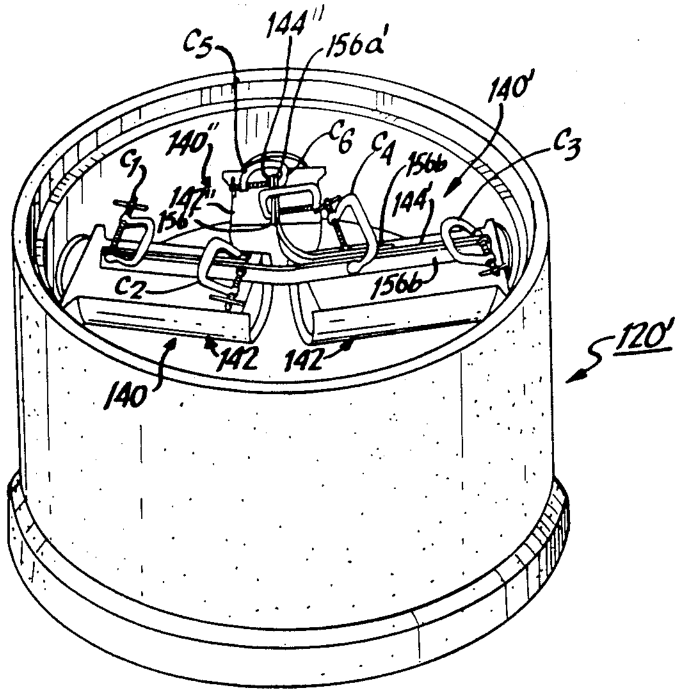

FIG. 9 is a perspective view showing channel-forming assemblies of the type shown in FIG. 6, fully assembled within a base member in readiness for the second pour of the two pour method.

Figure 10:
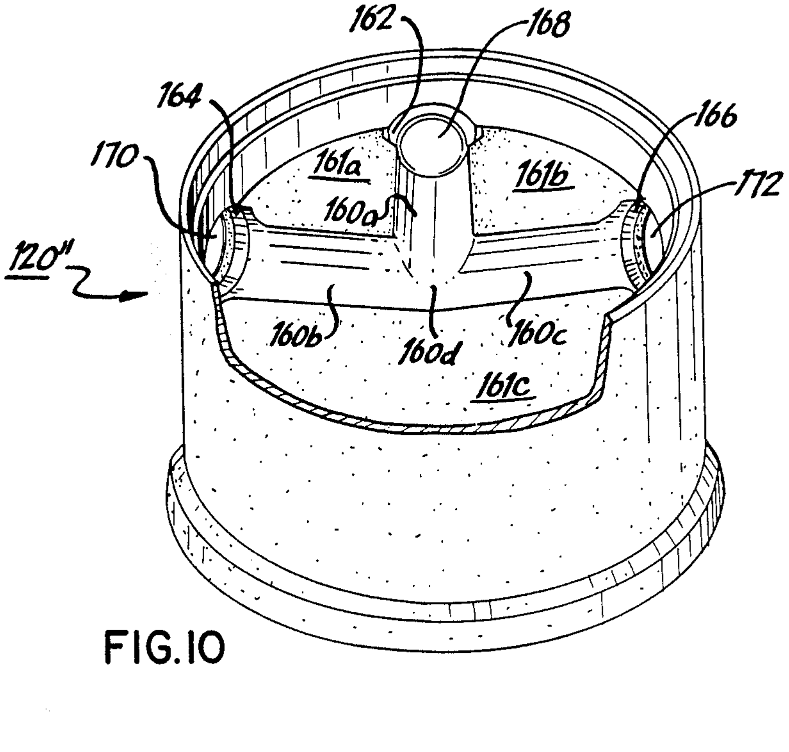

FIG. 10 shows a perspective view, partially sectionalized, of the base assembly of FIG. 9 after the invert has been case and set.

Figure 11:
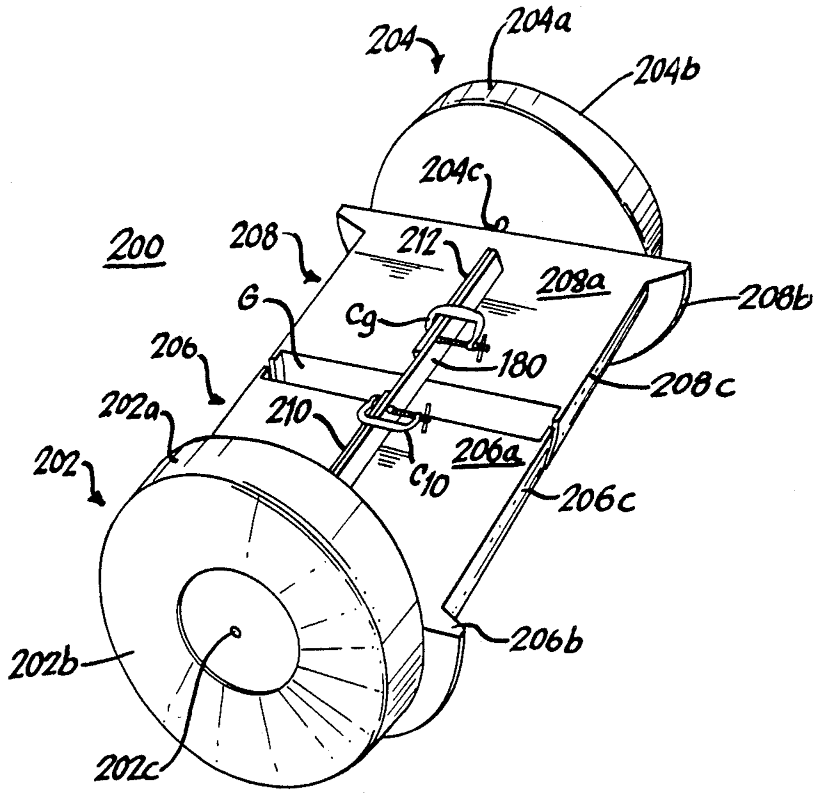

FIG. 11 is a perspective view of an assembly for forming an invert within a manhole assembly base member in accordance with the two pour technique for use in base members having large diameter sidewall openings.

Figure 1:
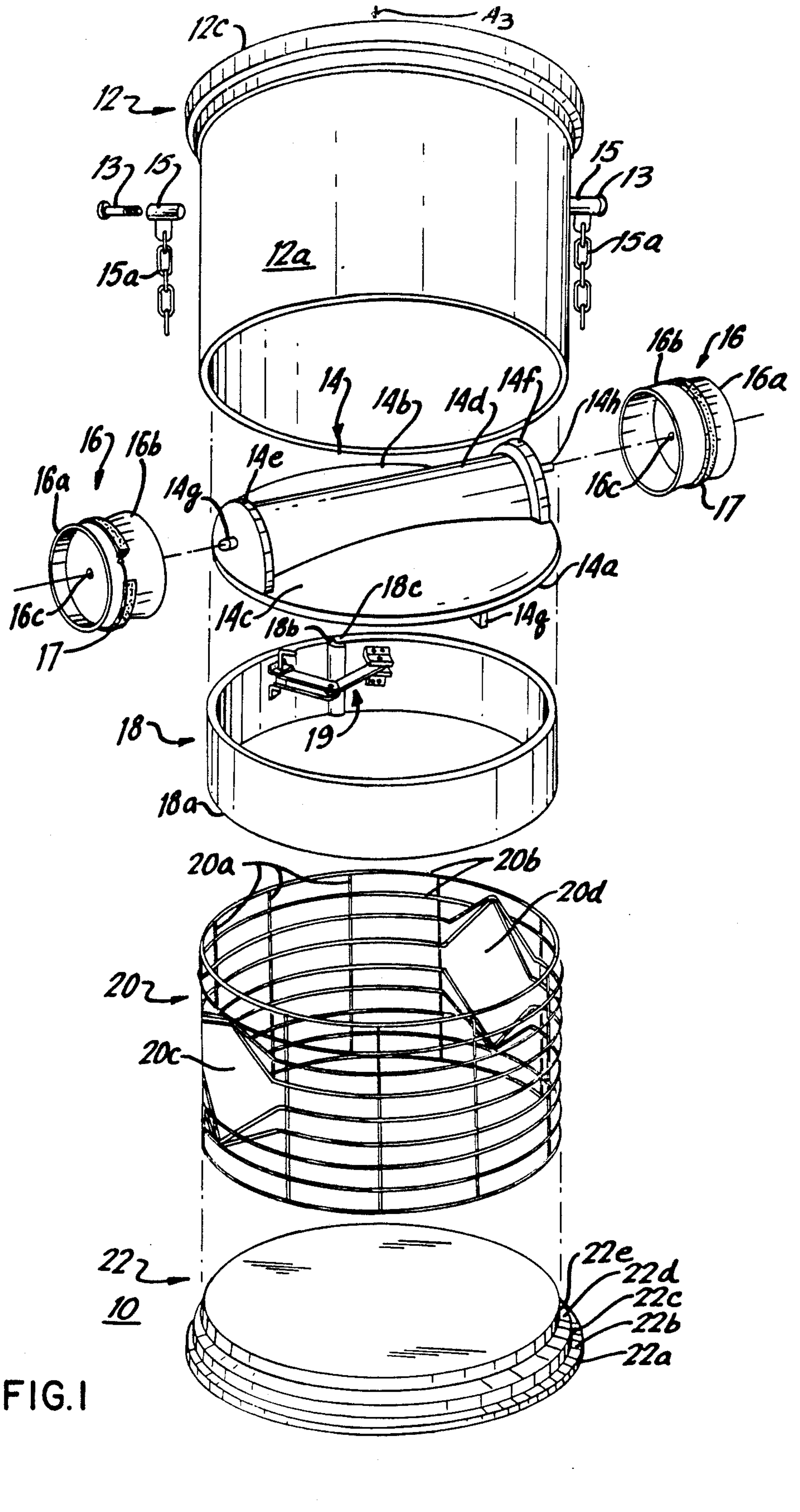
Figure 12:
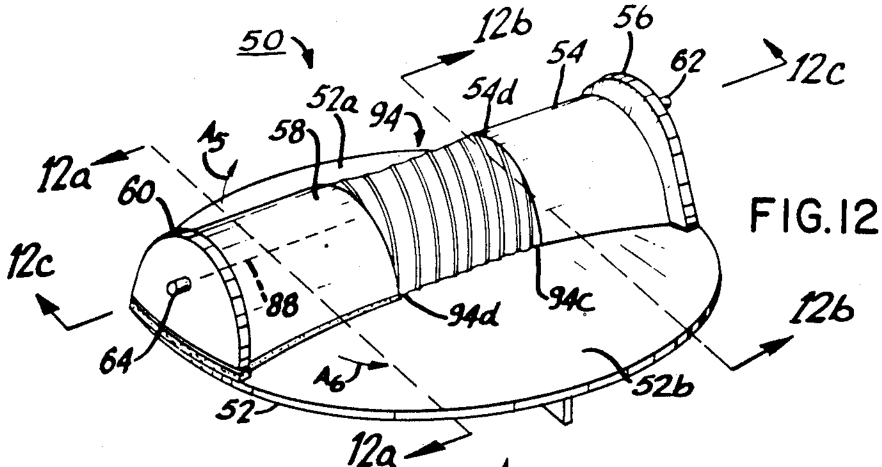

FIG. 12 is a perspective view of another alternative embodiment of the invert forming mold member of FIG. 1.

Figure 12A:
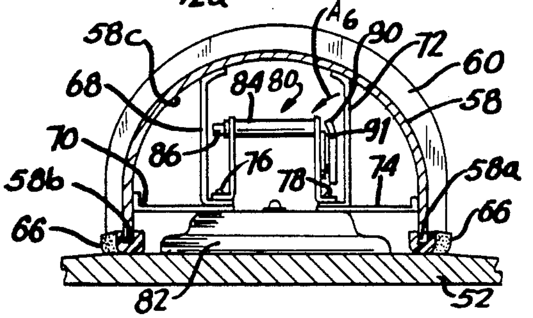

FIG. 12*a* shows a sectional view of a portion of the invert forming mold member of FIG. 12 looking in the direction of arrows 12*a*—12*a*.

Figure 12B:
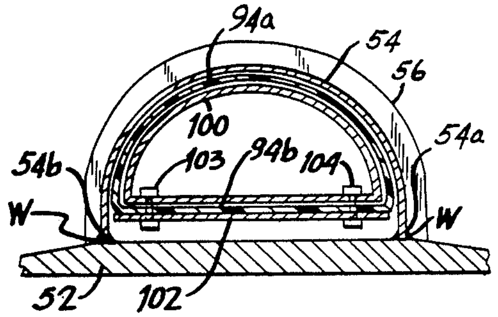

FIG. 12*b* shows a sectional view of a portion of the invert forming mold member of FIG. 12 looking in the direction of arrows 12*b*—12*b*.

Figure 12C:
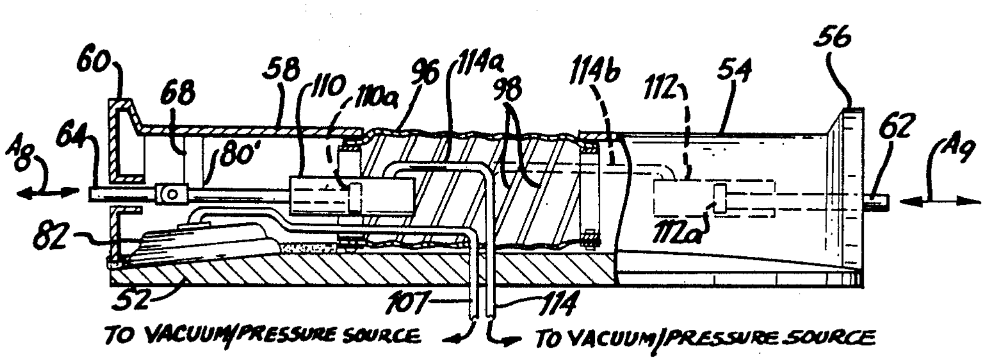

FIG. 12*c* shows an elevational view, partially sectionalized, of the invert forming mold member of FIG. 12.

Figure 13:
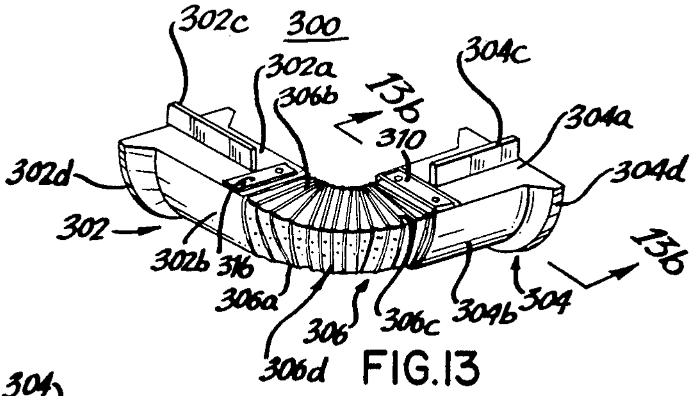

FIG. 13 is a perspective view of an alternative embodiment for the invert forming mold assembly of FIG. 6 employed for forming base members in accordance with the two pour technique.

Figure 13A:
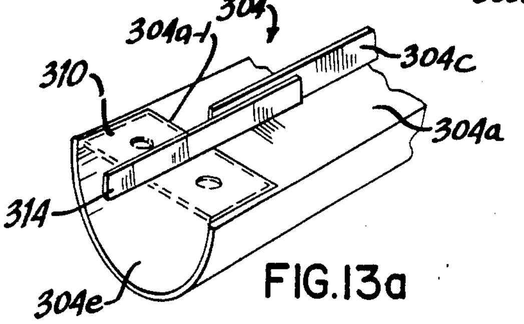

FIG. 13*a* is a perspective view of one of the invert forming members of FIG. 13 showing the manner in which a clamping bar is arranged thereon.

Figure 13B:
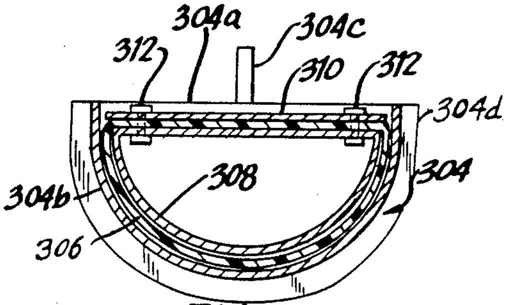

FIG. 13*b* shows a sectional view of a portion of the invert forming assembly of FIG. 13 looking in the direction of arrows 13*b*—13*b*.

Figure 14:
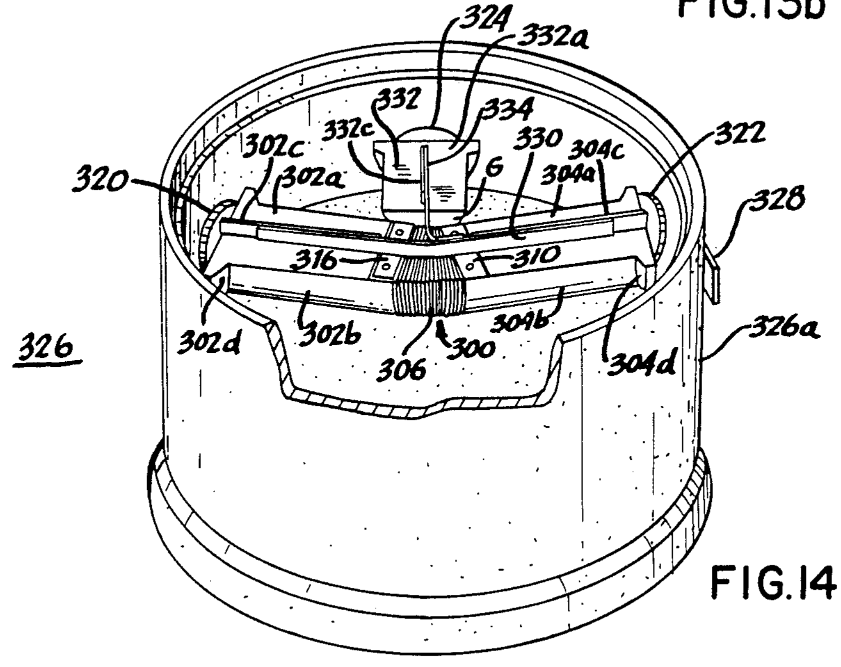

FIG. 14 shows a perspective view, partially sectionalized, of a manhole assembly base and showing the manner in which an invert forming assembly of the type shown in FIG. 13 is mounted therein preparatory to casting the invert within said manhole base.

Figures 15, 16A:
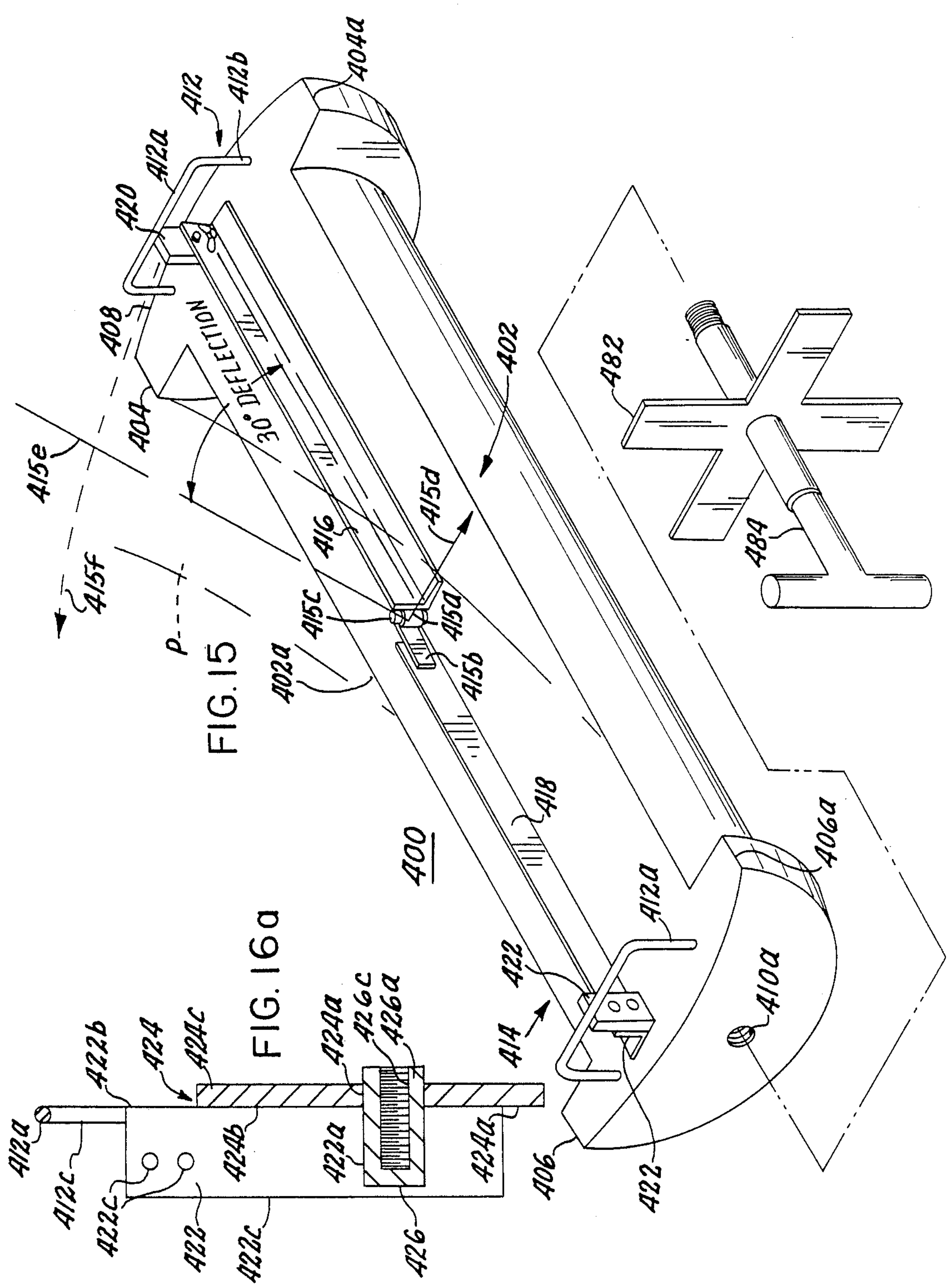

FIGS. 15 through 19 show another embodiment of the invention, in which:

FIG. 15 is a perspective view of the completed invert form.

Figure 16:
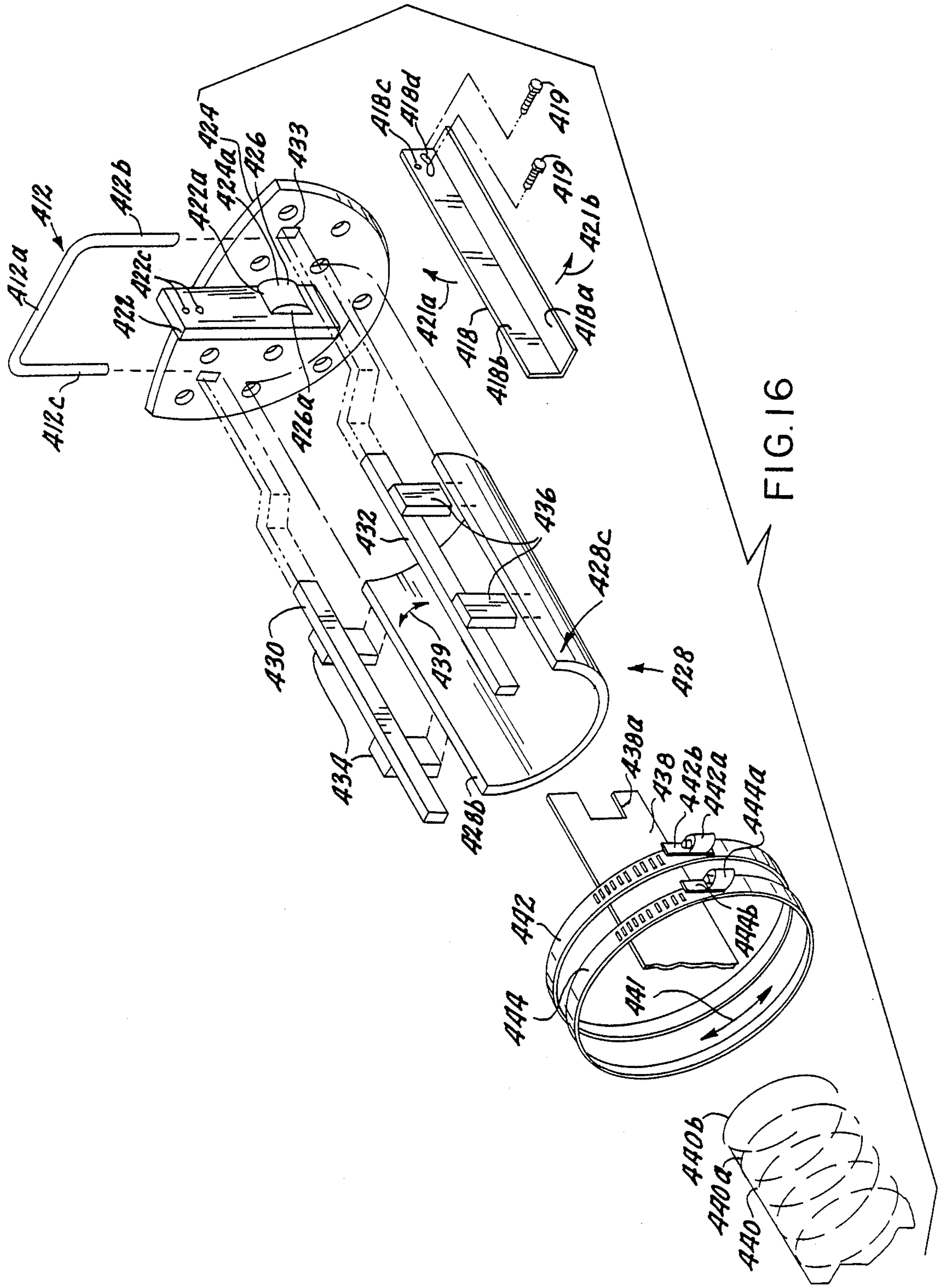

FIG. 16 is an exploded perspective view of the internal structure of one end of the invert form of FIG. 15.

FIG. 16a is an enlarged elevational view of a portion of the internal structure of FIG. 16 and which is partially sectionalized.

Figure 17:
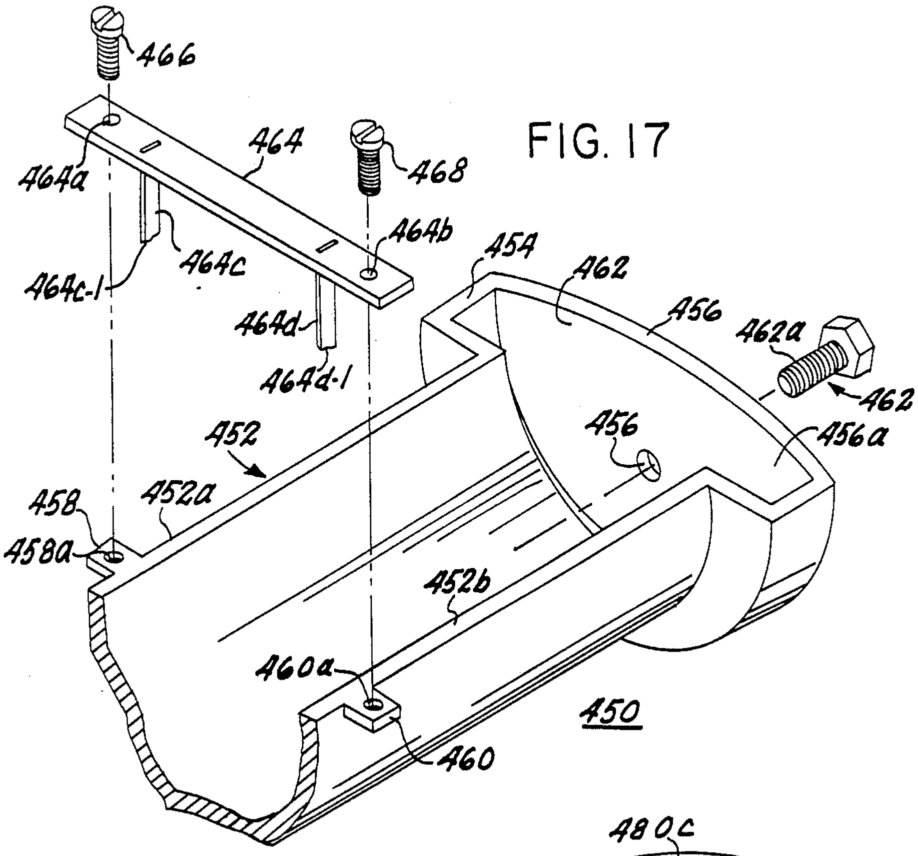

FIG. 17 is a perspective view of a portion of the mold used for producing the invert form of FIG. 15.

FIG. 17a is a detailed elevational view of the antiflotation structure used with the mold of FIG. 17.

Figure 18:
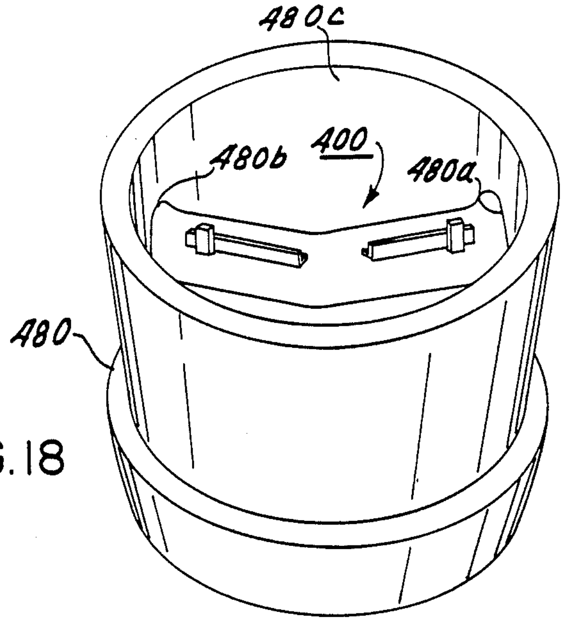

FIG. 18 is a perspective view showing an invert form of the type shown in FIG. 15 arranged in a manhole base.

FIGS. 19a to 19d are plan views showing four different invert forms embodying the principles of the present invention.

DETAILED DESCRIPTION OF THE INVENTION

FIG. 1 shows an exploded perspective view of the molding apparatus 10 employed for forming a manhole assembly base member in accordance with the single pour technique. The molding apparatus 10 is comprised of a disc-shaped member 22 having an outermost periphery 22a adapted to be received within the interior of the lower edge of sidewall 12a of the outer cylindrical mold member 12. The outer cylindrical mold member 12 defines the exterior wall of the manhole base. The manhole base is cast "upsidedown" as will be described in detail hereinbelow. Outer cylindrical mold member 12 is provided with a pair of collars 15, 15 swingably mounted to the exterior of outer cylindrical mold member 12 by fastening pins 13, 13. Collars 15, 15 are each provided with a short section of chain 15a, 15a to receive hooks (not shown) from an overhead crane, for example, for lifting and rotating the molding apparatus 10 as will be more fully described.

Cylindrical shaped inner mold member 18 is provided with a hinge assembly 19 for respectively increasing or reducing the diameter of the cylindrical inner mold member 18 for a purpose to be more fully described. The hinge assembly 19 is initially arranged to increase the diameter of the cylindrical inner mold member to properly position member 18 upon member 22, so that the cylindrical periphery 22e extends into the interior of mold member 18 and engages the inner periphery thereto, whereby lower edge 18a rests upon surface 22d of member 22.

The wire reinforcement frame 20 is arranged between inner mold member 18 and outer mold member 12 so that its lower edge rests upon surface 22d. Frame 20 is comprised of a plurality of vertically arranged wires 20a and horizontally aligned circular-shaped wire loops 20b which define the wire frame 20 to form a reinforcing frame which is molded into the interior of the cast manhole base, as will be more fully described. The wire frame 20 is bent to form openings 20c and 20d for receiving the gasket retainer assemblies 16, 16.

The mold member 14 which forms and defines the invert in the manhole base is comprised of a main body portion 14a having sloping surfaces 14b and 14c arranged on opposite sides of the generally cylindrical shaped invert forming projection 14d. Flange-like portions 14e and 14f arranged at the ends of a substantially cylindrical shaped projection 14b form recesses within the interior of the manhole base to facilitate insertion of connecting pipes, as will be more fully described. Registration pins 14g and 14h reciprocally mounted within the body of member 14 are arranged to be respectively moved so as to extend outwardly from the ends of projections 14d or to be drawn inwardly for purposes to be more fully described.

FIGS. 1 and 2a through 2c show the invert forming mold member 14, which is provided with a guideway 14j slidably receiving and mounting registration pin 14h. An elongated projection 14k is integrally joined to the inner end of registration pin 14h. Projection 14k extends downwardly through an elongated slot 14l provided in the underside 14m of body member 14a. A similar slot 14n is provided for projection 14p which is integrally joined to the inner end of registration pin 14g. Projections 14k and 14p are reciprocally movable as shown by double-headed arrows A1 and A2, in order to respectively extend and withdraw their associated registration pins 14h and 14g. Projections 14q and 14r, extending downwardly from the underside of mold member 14, serve as alignment means for aligning member 14 upon the inner cylindrical mold member 18.

Figure 1A:
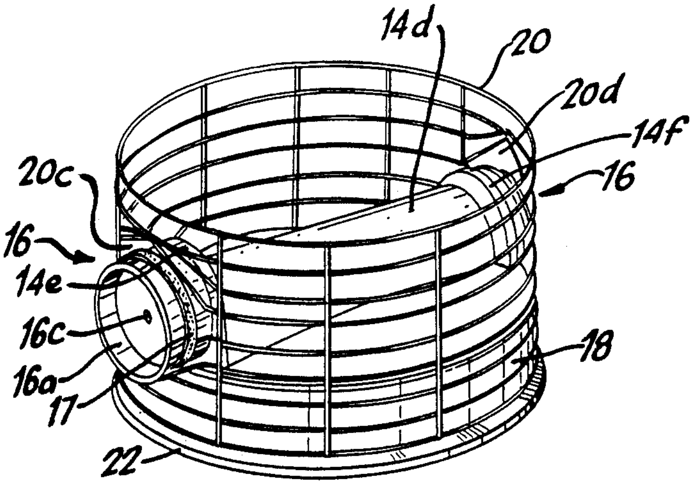

FIG. 1a shows a sub-assembly of the casting apparatus 10 of FIG. 1 wherein the inner cylindrical mold member 18 is shown having its lower edge supported upon disc-shaped member 22. The reinforcing frame 20 has its lower edge supported upon disc-shaped member 22 and surrounds inner cylindrical mold member 18. The projections 14k and 14p, which extend downwardly and into the interior of inner cylindrical mold member 18, are moved radially outward so that their associated pins 14h and 14g extend outwardly from the end surfaces 14f-1 and 14e-1 of the mold member 14. The registration pins 14h and 14g extend into the openings 16b, 16b of the gasket retainer ring assemblies 16, 16. The gasket retainer assemblies are comprised of inner and outer ring members 16a, 16b, arranged to sandwich a gasket 17 therebetween. Note especially the left-hand ring assembly of FIG. 1. The aforesaid gasket 17 is also shown in FIG. 3c in sectional fashion. Ring members 16a, 16b have been shown in dotted fashio in FIG. 3c. As can best be seen from the last-mentioned figure, the inner or substantially D-shaped portion 17a of the gasket 17 is sandwiched between inner and outer ring members 16a and 16b. The substantially T-shaped portion 17b of gasket 17 extends radially outward from the ring members 16a and 16b and is adapted to be embedded within the casting material, as will be more fully described. Releasable fastening means (not shown for purposes of simplicity) are utilized to secure ring members 16a and 16b to one another and to firmly secure gasket 17 thereto.

The outer cylindrical mold member 12 is then lowered upon the sub-assembly of FIG. 1a, thereby completing the assembly of the mold members utilized to cast a manhole assembly base. The casting material is then deposited into the inner upper end of outer cylindrical mold member 12, the casting material being deposited by gravity so as to fall in the direction of arrow A3 shown in FIG. 1, thereby filling the region defined by the lower inner periphery of mold member 12 and the outer periphery of mold member 18 to form the sidewalls of the cast member and further being deposited upon the upper surface of mold member 14. The mold assembly 10 is filled to a level substantially flush with the top edge 12c of outer cylindrical mold member 12, and is thereafter allowed to set. In order to reduce the time required for the casting material, which is preferably concrete, to set, the entire casting apparatus 10 of FIG. 1 is enclosed within a shroud or housing (not shown) and stem is introduced into the last-mentioned shroud to raise the temperature level of the casting material and thereby speed up the casting operation.

The gasket mounting assemblies 16, 16 are pressed against the interior wall of outer cylindrical mold member 12 and against a portion of the outer periphery of the inner cylindrical mold member 18 in order to form an define the sidewall openings.

After the casting material has been set, the entire assembly is lifted by coupling a pair of hooks (not shown) from an overhead crane (not shown) to the chains 15*a*, 15*a*, and the entire assembly is partially lifted off the ground and is rotated about collars 15, 15*c* so as to turn the entire assembly upside-down, after which the disc-shaped member 22 and the outer cylindrical mold member 12 are lifted upwardly and away from the cast manhole base. The clamping assembly 19 is manipulated to cause the marginal portions of the vertical ends 18*b* and 18*c* to overlap one another in order to reduce the outer diameter of inner cylindrical mold member 18, thereby enabling the inner cylindrical member 18 to be lifted out of the interior of the cast manhole base.

Thereafter, the elongated projections 14*k* and 14*p* are moved radially inwardly, i.e. toward one another, in order to withdraw the pins 14*h* and 14*g* from the gasket retaining assemblies, 16, 16. The mold member 14 is then lifted out from the interior of the cast manhole base.

Thereafter, the fastening means (not shown for purposes of simplicity) securing the ring-shaped halves 16*a* and 16*b* of each gasket retainer assembly 16, are loosened and then disassembled in order to remove the gasket retainer assemblies 16, 16 from the sidewall openings formed thereby. The gasket supporting assembly and gasket employed in the present invention are described in U.S. Pat. Nos. 3,796,406; 3,813,107; and 3,832,438, the aforesaid patents being assigned to the assignee of the present invention, and their teachings being incorporated herein by reference thereto.

Figure 3A:
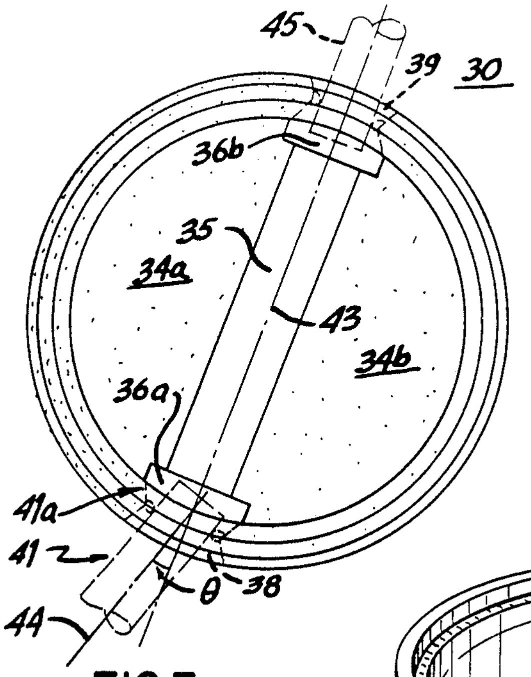
Figure 3D:
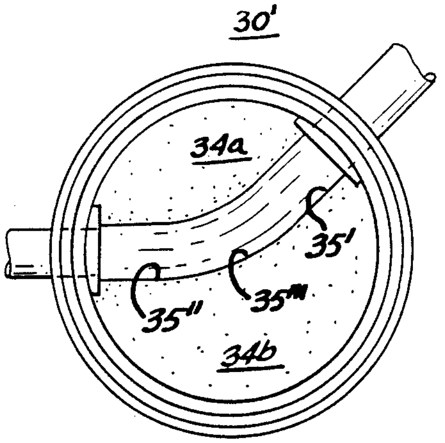
Figure 3B:
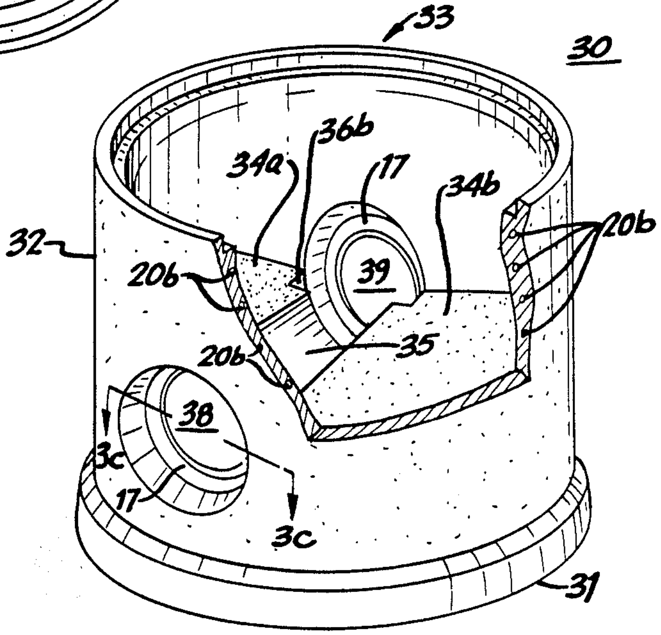
Figure 3C:
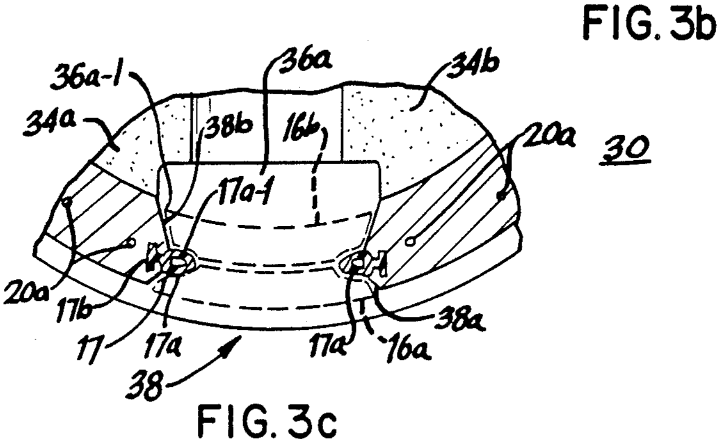

FIGS. 3*a* through 3*c* show the cast manhole base 30 resulting from the casting operation employing the apparatus 10 of FIG. 1, said cast manhole base 30 being comprised of a base portion 31 and an integral, upwardly extending cylindrical shaped sidewall 32 terminating in a step-like ledge 33.

The sloping surfaces 14*b* and 14*c* of mold member 14 form the sloping interior surfaces 34*a* and 34*b* of base member 30, said surfaces sloping downwardly toward invert 35 formed by the substantially cylindrical shaped projection 14*d*, forming an integral part of mold member 14. Surfaces 14*d* and 14*c* cause liquids on surfaces 14*b* and 14*c* to run back into invert 35.

Flange portions 14*e* and 14*f* form and define the recesses 36*a* and 36*b* which are substantially semi-circular shaped recesses arranged between the outer ends of invert 35 and the associated sidewall openings 38 and 39. As can best be seen in FIG. 3, sidewall opening 38 has a tapered portion 38*a* which tapers inwardly toward gasket 17, and a tapered portion 38*b* which tapers outwardly away from gasket 17 and which substantially merges with the outward radial end 36*a*-1 of recess 36*a*. The D-shaped portion 17*a* of gasket 17 can be seen to have a hollow interior portion 17*a*-1, which enables the gasket to be compressed upon insertion of a connecting pipe. The gasket 17 serves as a pipe-to-man-hole seal. Joint assembly is quick and easy. The end 41*a* of pipe 41, as shown in dotted fashion in FIG. 3*a*, is coated with a suitable lubricant and is pushed into the sidewall opening 38*a*. The gasket 17 provides a compression-type joint with no moving parts and the simplicity of the joint assembly eliminates both human error and the problems inherent in rigid joints. The retainer rings 16, 16 hold the gaskets 17, 17 in a shape which precisely conforms to the curvature of the openings 38 and 39. Gaskets 17 provide a positive watertight seal and, together with its associated recess, for example recess 36*a*, provide at least 10° of omni-directional deflection of pipe 41 relative to the longitudinal axis 43 of the manhole base 35. As is typical in the installation of the pipe 41, the end of the pipe 41 remote from end 41*a* is coupled to an adjacent pipe after first installing end 41*a* into manhole base 30. The pipe 41 is typically arranged at an angle $\theta$ relative to longitudinal axis 43 until its end 41*a* is moved into sidewall opening 38 by an amount sufficient to cause its end remote from end 41*a* to clear the end of the pipe (not shown) to which it is to be subsequently joined, whereupon the pipe 41 may then be moved so that its longitudinal axis 44 is brought into coincidence with longitudinal axis 43. Thus, the recesses 36*a* and 36*b* provide the valuable function of facilitating insertion of each pipe, such as pipe 41, into its associated sidewall opening, such as opening 38.

The registration pins 14*g* and 14*h* which cooperate with the central openings 16*c* in the gasket retaining assemblies 16, 16 assure precise alignment between sidewall openings 38 and 39 and invert 35, thereby assuring smooth, non-turbulent flow of liquid matter as the liquid matter transfers from the incoming pipe 41 to the invert 35 and from the invert 35 to the outgoing pipe 45. The casting operation described hereinabove also enables the manhole base 30 and the invert 35 to be formed in a single operation and at the same site, preferably the factory site, thereby significantly increasing productivity and reducing production costs, as well as providing a more uniform product.

The casting apparatus described hereinabove in connection with FIGS. 1 through 3*c* is extremely advantageous for use in standardized manhole bases. For example, the manhole base 30 shown in FIGS. 3*a*-3*c* has a linear invert 35 extending along an imaginary diameter 43 of the manhole base 30. This invert configuration 35 is utilized in a vast majority of applications making it practical to design and produce a mold member of the type shown as mold member 14. However, in situations where manhole bases having non-standard sidewall openings and accompanying inverts are required on a less frequent basis or in small quantities which do not warrant the above mass production techniques but nevertheless should be of the same accuracy and precision design, an alternative design may be used in conjunction with all of the techniques as will be described hereinbelow.

In order to form manhole bases in accordance with the single-pour technique in which sidewall openings may be arranged at angular orientations other than that shown in FIG. 3*b*, the mold member 50 shown in FIGS. 12 through 12*c* may be used in place of the mold member 14 shown in FIGS. 1 and 2*a* through 2*c*.

Figure 2A:
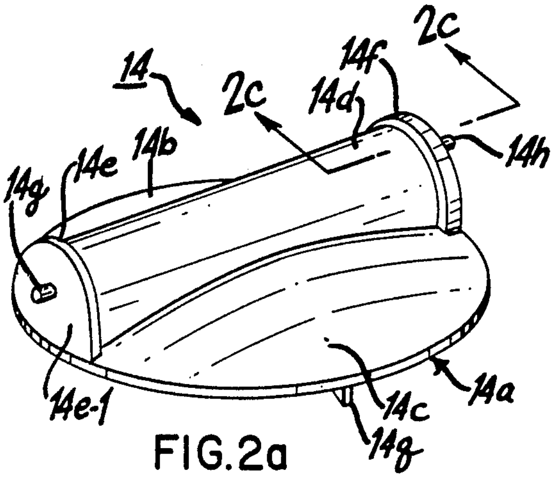
Figure 2B:
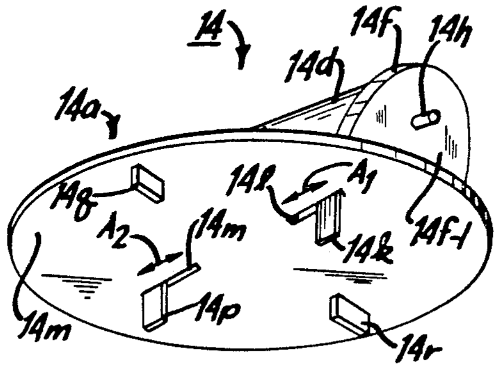
Figure 2C:
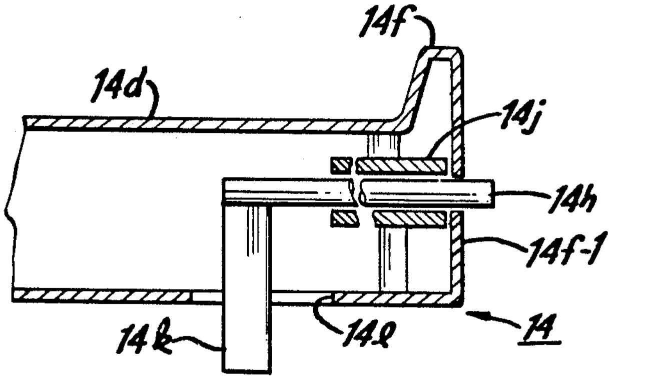

Mold member 50 is comprised of body portion 52 having sloping sidewalls 52*a* and 52*b* similar to the sloping sidewalls 14*b* and 14*c* of mold member 14 shown, for example, in FIG. 2*a*. The invert forming projection of mold member 50 is comprised of a stationary portion 54 integrally joined to body portion 52 and having a recess forming flange 56 at its outer end, flange 56 being substantially the same as flange 14f shown, for example, in FIG. *2a.*

The invert forming projection is further comprised of a movable invert portion 58 of substantially cylindrical shape and having an outward radial end provided with a recess forming flange 60 which is substantially the same as flange 14*e* shown, for example, in FIG. *2a.* Flanges 56 and 60 are designed to form the recesses such as, for example, the recesses 36*b* and 36*a* of manhole base 30, shown in FIGS. *3a—3d.* Registration pins 62 and 62 are reciprocally mounted in a manner similar to registration pins 14*g* and 14*h* of mold member 14 shown, for example, in FIGS. *2a* and *2b* and are operated in a manner to be more fully described.

A sectional view of invert forming member 58 is shown in FIG. 12*a* and this invert forming member can be seen to be hollow and has a substantially semi-oval shape. The lower edges 58*a* and 58*b* are positioned just above the top surface of body member 52. Channel-shaped resilient sealing gaskets 66, 66, are fitted about the lower edges 58*a,* 58*b,* to provide a resilient mount for supporting edges 58*a,* 58*b* on the top surface of body member 52 and to prevent casting material from entering into the region between projection 58 and the top surface of body member 52. A supporting assembly comprised of brackets 68*a,* 70, 72 and 74 have their outer ends secured to the interior surface 58*c* of invert forming portion 58 and have their opposite ends secured by suitable fastening means 76, 78 to a vacuum grip assembly 80 comprised of a resilient, compressible, substantially bell-shaped member 28 and a pumping assembly 84 having a reciprocating, manually manipulatable operating button 86 which, when repeatedly depressed and released, draw a vacuum in the interior region defined by bell-shaped member 82 and the top surface of body portion 52, thereby firmly mounting invert forming member 58 upon the surface of body member 52. The movable invert forming member 58 can thereby be seen to be capable of being positioned at any suitable angle relative to invert forming portion 54 and is capable of being swung about an imaginary central axis represented by dotted line 88, in either the clockwise or counter-clockwise direction, as shown respectively by arrows A5 and A6. When it is desired to release the invert forming portion 58 from body portion 52, release arm 90 of vacuum grip assembly 80 is depressed rotating arm 90 in the clockwise direction, as shown by arrow A6 about pivot pin 91, causing the vacuum condition to be interrupted and allowing air at atmospheric pressure to be introduced into the hollow region between bell-shaped member 82 and the top surface of body portion 50, thereby releasing the vacuum grip assembly 80 and hence the invert forming portion 58 from body portion 52.

A sectional view of the invert forming portion 54 looking in the direction of arrows 12*b*—12*b*, is shown in FIG. 12*b.* The lower edges 54*a* and 54*b* are secured to the top surface of body portion 52 for example, by weldments W, W. A flexible invert forming portion 94 is arranged to span between invert forming portions 54 and 58 as can best be seen in FIGS. 12 and 12*c,* and is preferably formed of a rugged cloth or cloth-like material 96 which may be in the form of a wide band wrapped in an overlapping helical fashion so as to embed a preferably continuous, helically-wound supporting wire 98, to form flexible ducting 94 which, in most applications, is typically provided with a circular cross-sectional configuration. The flexible ducting assembly 94 of the present invention, however, is provided with a substantially D-shaped cross-sectional configuration defined by a generally semi-circular portion 94*a* and a linear surface portion 94*b,* shown best in FIG. 12*b.*

Both ends of flexible ducting assembly 94 are reinforced by D-shaped reinforcing frames 100 and cooperating straps 102. Since both reinforcing arrangements at both ends of flexible ducting 94 are substantially identical only one has been shown for purposes of simplicity. As shown in FIG. 12*b,* rigid D-shaped reinforcing frame 100 is positioned within the interior of flexible ducting assembly 94 and adjacent the right-hand end thereof (relative to FIG. 12). A linear strap 102 is positioned along the exterior surface of planar surface portion 94*b.* Strap 102 and D-shaped reinforcing member 100 are retained in position by fastening assemblies 103 and 104 which secure member 100 to member 102 and which sandwich the planar portion 94*b* of flexible ducting assembly 94 therebetween. The right-hand end 94*c* of flexible ducting assembly 94 is preferably force-fittingly inserted into the hollow region defined by the interior of the left-hand end 54*d* of invert forming portion 54 and the top surface of body portion 52. As was described hereinabove, the left-hand end 94*d* of flexible ducting assembly 94 is provided with a similar D-shaped reinforcing member 100 and strap 102 and similarly is preferably forcefittingly inserted between the interior surface of invertforming portion 58 and the top surface of body portion 52. Obviously, if it is desired to permanently secure flexible ducting portion 94 to invert forming portions 54 and 58, this may be accomplished for example, by providing suitable fastening means.

FIG. 12*c* shows an arrangement in which the registration pins 62 and 64 and the vacuum grip assembly 80 may be operated from a remote source. As shown in FIG. 12*c,* the manually operable vacuum grip assembly 80 is replaced by a vacuum grip assembly 80' secured to the interior of invert forming portion 58 by similar bracket means for example, by bracket member 68. Bell-shaped member 82 is coupled to a remote vacuum/pressure source, (not shown for purposes of simplicity) by means of conduit 107 to draw a vacuum in the interior region defined by bell-shaped member 82 and the top surface of body portion 52. The vacuum condition is selectively released by introducing air of at least atmospheric pressure into the aforesaid hollow interior region when it is desired to reposition invert forming portion 58.

Registration pins 62 and 64 may be reciprocally operated to be selectively moved in the directions shown by double headed arrows A8 and A9 by means of piston assemblies 110 and 112, each communicating with a remote vacuum/pressure source (not shown) by means of a common conduit 114 communicating with piston cylinders 110 and 112 by means of branch conduits 114*a* and 114*b.*

By introducing air under pressure into conduit 114, the piston members 110*a,* 112*a,* are moved in the outward radial direction causing the piston rods, which in actuality are registration pins 64 and 62, to move radially outward for insertion into the cooperating central openings in. The gasket retaining assemblies 16, 16 shown, for example, in FIG. 1.

By coupling conduit 14 to a vacuum source, pistons 110*a,* 112*a* may be drawn radially inwardly and toward one another to drawn pins 64, 62 into the interior of the invert forming portions 58 and 54, thereby automating these operations.

A manhole base is formed in accordance with the singlepour technique and utilizing the mold forming member 50, in a manner substantially similar to the technique described in connection with the apparatus 10 of FIG. 1 except that the movable invert forming portion 58 is positioned at the desired angle relative to invert forming portion 54. Flexible ducting assembly 94 is adapted to flex and form a smooth curved portion intermediate the inner ends of invert forming portions 54 and 58 thereby forming a continuous invert forming assembly defined by portions 54 and 58, and the flexible ducting 94 arranged therebetween.

Once movable invert forming member 58 is properly positioned, a vacuum condition is drawn by the vacuum grip assembly 80, or 80', to firmly secure invert forming portion 58 in the proper angular alignment relative to stationary invert forming member 54.

Thereafter, the invert forming member 50 is positioned upon the inner cylindrical mold member 18 shown in FIG. 1a, in place of the mold forming member 14. Obviously, the horizontally aligned wires 20b are bent in the manner shown in FIG. 1 at the proper angular orientations so as to coincide with the positions occupied by the outer ends of invert forming members 54 and 58. Thereafter, all of the mold forming steps are identical to those described hereinabove in connection with FIG. 1 to form a manhole base utilizing the single pour technique. The invert formed thereby will be provided with two substantially linear invert portions 35' and 36'' and a curved, intermediate portion 35''', as shown best in the manhole base 30' of FIG. 3d. The remaining advantageous features and characteristics of manhole base 30' are substantially identical to those described in connection with the manhole base 30 of FIGS. 3a through 3c.

The two pour technique may be employed in place of the single pour technique and is further uniquely advantageous for use in forming manhole bases having more than two sidewall openings. The first stage of the two pour technique is performed through the utilization of the casting apparatus 10' of FIG. 4 which is substantially identical to the casting apparatus 10 of FIG. 1, except that the mold member 14 provided in the apparatus 10 of FIG. 1 is not used in the two pour technique. More particularly, outer cylindrical mold member 12 is shown positioned upon disc-shaped member 22. Inner cylindrical mold member 18, although shown in exploded fashion, is also supported upon disc-shaped member 22 and is further provided with a closed top surface 18d. Wire reinforcing frame 20 is likewise positioned upon disc-shaped member 22 and the horizontally aligned wires 20b are bent to form openings 20c and 20d to receive the gasket retaining assemblies 16, 16.

In the absence of mold member 14, gasket retaining assemblies 16, 16, are properly positioned and secured in the desired position by threaded members T1, T2, which extend through openings 12d and 12e in outer cylindrical mold member 12, in order to threadedly engage openings 16c, 16c which are tapped to provide a threaded engagement with threaded fastening members T1 and T2. The threaded fastening members are provided with enlarged flange portions T1a and T2a which rest against the exterior surface of outer cylindrical mold member 12 so that when tightened, the threaded fasteners T1 and T2 cause the adjacent edges of retainer members 16a, 16a, to be firmly urged against the interior surface of outer cylindrical mold member 12. Once the above-mentioned mold members of casting apparatus 10' are fully assembled, the casting operation is begun. The manhole base is cast "upside-down". The hollow interior region between the exterior surface of inner cylindrical mold member 18 and the interior surface of outer cylindrical mold member 12 form and define the sidewalls of the manhole base. The remaining interior region between the closed end 18d of mold member 18 and the mold member 12 extending thereabove form and define the bottom of the manhole base.

After the casting material has been poured into the mold apparatus, the casting material is allowed to set. To facilitate the setting of the casting material the molding apparatus 10' may be covered with a housing or shroud (not shown for purposes of simplicity). Steam under pressure is then introduced into the shroud to raise the temperature level of the casting material and thereby accelerate the setting of the casting material.

Once the casting material has been set, hooks (not shown) coupled to an overhead crane (not shown) are connected to chains 15a, 15a, to lift the entire casting apparatus 10'. The apparatus 10' is lifted a distance above the ground sufficient to allow the entire casting apparatus to be turned "rightside-up", the casting apparatus being swung about the central axis of collars 15, 15. After being turned over, the casting apparatus 10' is then set upon the ground and threaded fasteners T1 and T2 are removed. The inner and outer mold members are then removed and the fastening means (not shown) coupling the gasket retaining members 16a and 16b of each gasket retaining assembly 16 are removed to remove member 16a and 16b from each of the sidewall openings which they form and define, thereby completing the casting operation.

Figure 4:
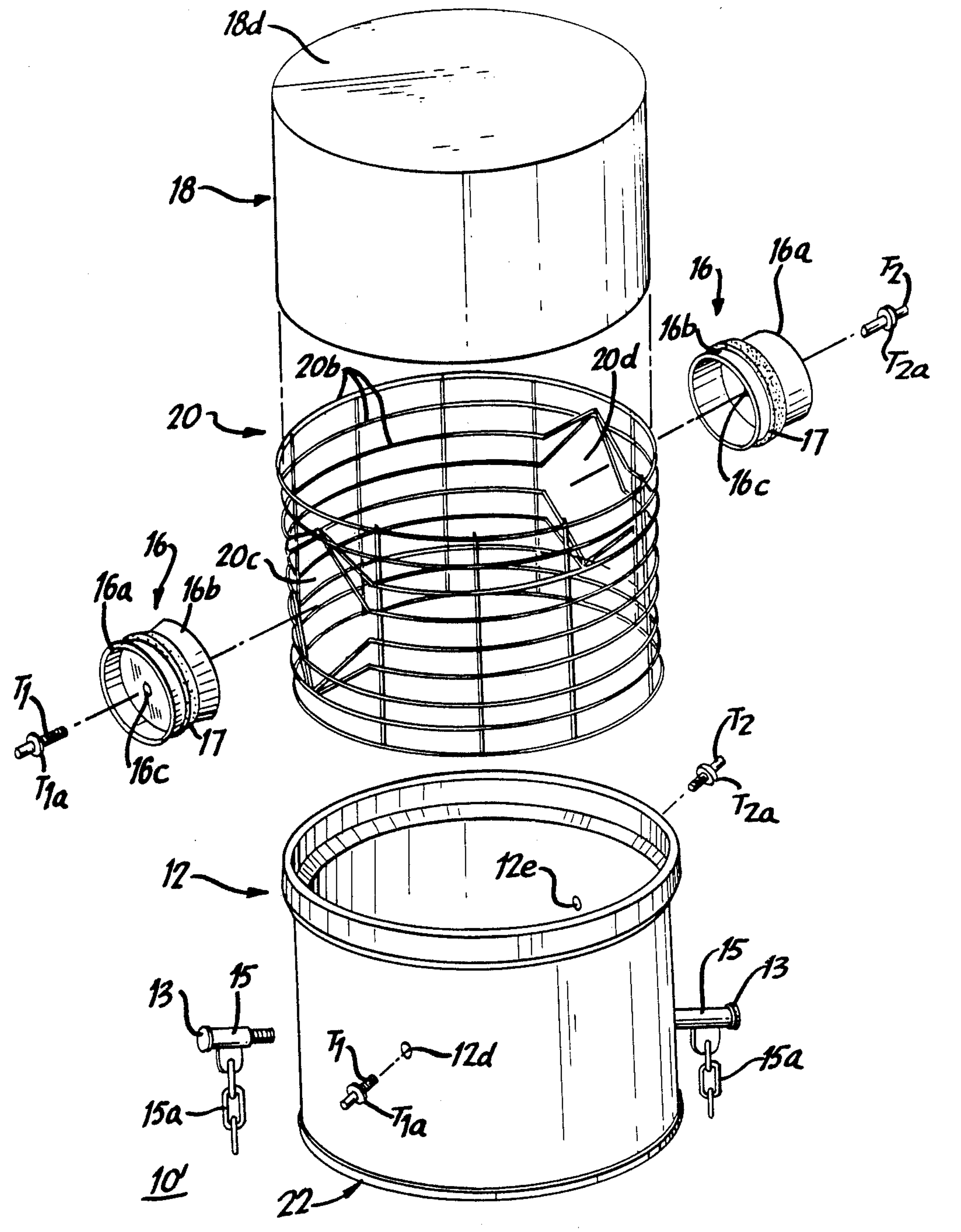
FIG. 4 shows an exploded perspective view of the molding apparatus employed for forming a manhole assembly base member in accordance with the two pour technique.

Although the example of FIG. 4 shows a molding apparatus for forming a manhole base having two sidewall openings, it should be understood that three or more sidewall openings may be formed through the use of the apparatus 10' of FIG. 4, and through the use of additional gasket retaining assemblies 16 and threaded fastening members T, as well as appropriate openings provided in the sidewall of outer cylindrical mold member 12 to position and secure the gasket retaining members at desired locations.

Figure 5:
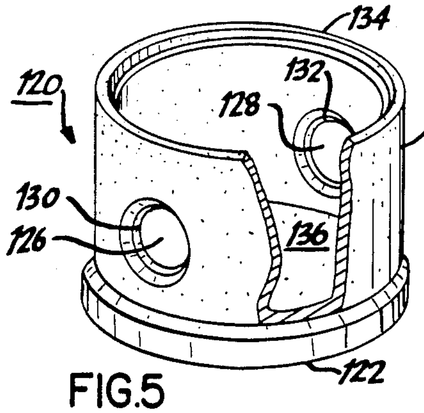
FIG. 5 shows a perspective view, partially sectionalized, of the manhole assembly base member cast through the use of the apparatus of FIG. 4.

FIG. 5 shows a manhole base 120 formed through the use of the molding apparatus 10' shown in FIG. 4, and being comprised of a bottom portion 122 and integral upwardly extending sidewall 124 having openings 126 and 128, each provided with a resilient compressible gasket 130 and 132, respectively. The step-like upper edge 134 is designed to receive and support a complementary step-like lower edge of an intermediate or riser member of a manhole assembly (not shown), as is conventional in manhole assembly technology.

The interior floor 136 of manhole base 120 is substantially flat and is positioned well below the lower ends of the sidewall openings 126, 128.

The second phase of the two pour technique, i.e. the formation of the invert, is performed through the use of the apparatus 140 shown in FIGS. 6 through 8b and comprised of an invert forming member 142 having a substantially cylindrical shaped portion 142a, a planar upper surface 142b, having an elongated flat bar 144 integrally joined thereto and having a substantially semi-circular shaped recess forming flange portion 142c provided at one end thereof and adapted to form the recess arranged between the outer end of the invert and the adjacent sidewall opening, such as for example the recesses 36*a* and 36*b* shown in FIG. 3*a*, and the recesses to be described hereinbelow in connection with FIG. 10.

Flange portion 142*c* has a planar end surface 142*d* provided with a tapped opening 142*e* which is coaxial with the longitudinal axis of semi-cylindrical portion 142*a*.

Dish-shaped registration member 146 forming part of the invert forming assembly 140 is comprised of a centrally located disc-shaped portion 146*a* and an integral flange 146*b* sloping outwardly therefrom. The disc-shaped central portion 146*a* has a curvature conforming to the curvature of gasket 17. A centrally located opening 146*c* is provided in disc-shaped portion 146*a*.

Dish-shaped registration member 146 is press-fitted into opening 126, so that the exterior surface of flange 146*b* rests upon tapered surface 126*a* of opening 126 and so that the marginal portion of disc-shaped central portion 146*a* rests against the right-hand surface 17*f* and conforms with the curvature of gasket 17.

An elongated threaded rod 148, also forming part of the invert forming apparatus 140, is extended through opening 146*c* and threadedly engages tapped opening 142*e*. The left-hand end of threaded rod 148 extends through an elongated slot 150*a* in rigid elongated plate 150 which is positioned to span opening 126 and rest against the exterior surface of sidewall 124. Elongated threaded rod 148 has a length sufficient to extend through elongated slot 150*a*. A butterfly fastener 152 is threaded on to the left-hand end of rod 148 and is adequately tightened an amount sufficient to cause dish-shaped registration member 146 to be pressed firmly against gasket 17 and to cause invert forming member 142 to be tightly drawn against dish-shaped registration member 146.

Opening 146*c* is located along an imaginary axis 154 which is precisely aligned with and passes through the center of opening 126, which is also the center of gasket 130. Opening 142*e* in member 142 is also coincident with imaginary axis 154 which coincides with the longitudinal axis of the invert forming portion 142*a*. By interconnecting all of the components of the invert forming assembly 140 shown in FIG. 6, precise alignment between the portion of the invert formed by member 142 and sidewall opening 126 is simply and yet positively assured.

An assembly substantially identical to the invert forming assembly 140 of FIG. 6 is secured in place in each of the sidewall openings 126 and 128. Obviously in embodiments in which three or more sidewall openings are provided, an appropriate number of assemblies 140 is provided for each such sidewall opening.

FIG. 9 shows a manhole base 120' substantially similar to the manhole base 120 of FIG. 5 and having three sidewall openings, each having an invert forming assembly 140, 140' and 140'' mounted thereto in the manner described hereinabove in connection with FIG. 5.

In order to be assured that each of the assemblies 140 through 140'' have their interior ends in the proper angular orientation and to further assure that the invert forming members 42, 142' and 142'' are horizontally aligned, i.e. have their upper surfaces 142*b*, 142*b'* and 142*b''* lying in a common imaginary horizontal plane, elongated rigid bars are clamped in place to obtain such alignment. For example, FIG. 6 shows an elongated rigid bar 156 bent at 156*a* so that two straight portions 156*b* and 156*c* form an angle $\phi$ which angle is precisely the desired angle to be formed between the invert forming portions so joined. Straight portion 156*b* is placed against elongated projection 144 and with its lower edge 156*b*-1 resting against plana top surface 142*b*. Suitable clamping means, such as, for example, the clamping means C1 and C2, are utilized to retain the portion 156*b* of bar 156 in position relative to elongated projection 144 and hence member 142. The remaining half 156*c* of bar 156 is placed against projection 144' of assembly 140' and resting on surface 142*b'* and is similarly clamped into place by clamping members C3 and C4. This technique assures that the top surfaces 142*b* and 142*b'* of members 142 and 142' lie in a common horizontal plane, further assuring precise alignment and accurate registration as between the invert to be formed thereby and the associated sidewall openings in the manhole base 120'.

Precise alignment and orientation of invert forming assembly 140'' is accomplished in a similar manner by utilization of a bent bar 156' having its linear portion 156' clamped to projection 144'' by clamping means C5 and C6 and having its linear half 156*b'* clamped to projection 144' by clamping means C4.

When the assemblies shown in FIG. 9 are fully assembled and interconnected to one another in the manner described hereinabove, the casting material is poured into the interior of manhole base 120' to fill the interior thereof to the proper height. The sloping surfaces surrounding the invert are manually shaped and formed by operators as the casting material is poured into manhole base 120'. The center portion 160*d* of the invert in the region of the gap G between the inner ends of the invert forming assemblies 140, 140' and 140'' is manually formed by the operators during the casting operation. After the casting material has been poured and allowed to set, the assemblies 140, 140' and 140'' are disassembled and removed from manhole base 120'. The completed manhole base 120'' is shown in FIG. 10 as having an invert defined by three invert portions 160*a*, 160*b* and 160*c*. The flanges such as, for example, the flange portion 142*c* of FIGS. 6 and 8*a*, form the recess portions 162, 164 and 166 positioned between the outer end of each invert portion 160*a*, 160*b* and 160*c* and the associated sidewall opening 168, 170 and 172 respectively.

FIGS. 6*a* and 6*b* show a clamping bar assembly 180 which may be substituted for the clamping bar 156 shown, for example, in FIG. 6. The clamping bar assembly 180 is comprised of cooperating members 182 and 184, each being comprised of an elongated bar 182*a*, 184*a* and a dish-shaped coupling member 182*b*, 184*b* respectively, each said cup-shaped member being provided with a central opening 182*b*-1, 184*b*-1 for receiving fastening member 186 in the form of a threaded bolt adapted to threadedly engage nut 188. The exterior diagonally aligned surface portion 182*b*-2 of dish-shaped member 182*b* is knurled or otherwise roughened and the interior diagonally aligned surface 184*b*-3 of dish-shaped member 184*b* is likewise knurled or roughened and cooperates with knurled surface 182*b*-2 to lock the dish-shaped members 182*b* and 184*b* together when fastening members 186, 188 are suitably tightened. The dish-shaped members 182*b*, 184*b* and hence the bars 182*a*, 184*a*, may be arranged at any desired angular orientation in order to coincide with the angular orientation of the invert forming members such as, for example, member 142 in order to clamp the invert forming members at the proper angle. If desired, a marker 190 may be provided on dish-shaped member **182*b* and cooperating indicia may be placed about the exterior diagonally aligned surface 184*b*-2 to cooperate with marker 190 in order to facilitate setting of arms 182*a*, 184*a*** at the desired angular orientation.

FIG. 11 shows a typical assembly 200 similar to the assembly 140 of FIG. 6 and which may be employed to form an invert in a relatively large size manhole base, the assembly 200 of FIG. 11 preferably being formed of a plastic material to minimize production costs, although any other suitable material may be employed if desired. The most prevalent size manhole base typically is designed to accomodate a pipe having an 8" outer diameter. However, manhole bases of relatively large size can be designed to accommodate a concrete pipe having an outer diameter of 2 feet or more. The invert forming assembly 200 is designed to form an invert of a very large size diameter and, as a result, is provided with a pair of dish-shaped registration members 202, 204 each adapted to be positioned within the interior half of a sidewall opening and having surfaces **202*a*, 204*a* arranged to rest against the tapered interior surface 126*a* of sidewall opening 126 (see FIG. 6) while the outer marginal portion of surfaces 202*b*, 204*b* are designed to rest against the surface 17*f* of gasket 17. As we described hereinabove, and especially due to the large diameter of the sidewall opening, each sidewall opening, such as sidewall opening 126**, for example, has a curvature conforming to the radius of curvature of the manhole base gasket which conforms to the radius of curvature of the manhole base sidewall, said radius of curvature being measured in a horizontal plane which is perpendicular to the sidewall of the manhole base.

The invert defining members 206 and 208, similar to the invert defining member described in connection with FIG. 6, are each provided with a planar top surface **206*a*, 208*a* having an elongated linear projection 210, 212 and having the outer ends thereof provided with flange portions 206*a*, 208*a* for forming the aforementioned recesses arranged between the outer ends of the invert and the associated sidewall opening. The substantially semicircular shaped peripheries 206*c*, 208*c* form and define associated portions of the invert within the manhole base. The invert forming assembly 200 is mounted within a manhole base of the type shown in FIG. 9 in a manner substantially the same as and utilizing substantially the same apparatus as the invert forming assembly shown in FIG. 6. More specifically, each dish-shaped registration member 202, 204 is provided with a central opening 202*c*, 204*c* and, although not shown, the outer ends of invert forming members 206 and 208 are likewise provided with cooperating tapped openings for receiving a threaded rod such as, for example, the threaded rod 148 of FIG. 6. Openings 202*c*, 204*c* are coincident with the center of the openings 126, 128 in sidewall 124 (see FIG. 5). The openings (not shown) provided in members 206 and 208 are coincident with the longitudinal axis of the invert to be formed. These centers are simply and rapidly brought into precise axial alignment when the assembly 200 is mounted within manhole base 120 and fixedly secured in place through the additional means of the rigid plate 150 and fastener 152. As was described hereinabove, the gap G between the inner ends of members 206 and 208 is formed during the casting operation to conform to the shape of the invert by operators who remove sufficient casting material to provide the desired shape of the invert at the intermediate portion thereof. Similarly, the operators also move and/or shape the casting material in the region on opposite sides of the invert being formed to form surfaces 161*a*, 161*b*, 161*c* (see FIG. 10**) which slope downwardly toward the invert in order to assure that any liquid falling upon such sloping surfaces flows downwardly along the sloping surfaces to be returned to the invert.

The horizontal alignment of the assembly 200 is obtained through the use of a clamping member 180 and clamping assemblies C9 and C10, by clamping member 180 to projections 210 and 212 in a manner described hereinabove in connection with the embodiment of FIG. 6. Forming the assembly 200 as shown in FIG. 11 of a suitable plastic material such as synthetic polyester, for example, greatly reduces production costs for producing assemblies 200 and yet provides apparatus which is sufficiently durable to withstand repeated use.

As was the case with the mold structure employed in the single-pour apparatus, the apparatus shown, for example, in FIGS. 6 and 11 may be modified to provide an intermediate flexible connector similar to that employed with the single-pour mold forming apparatus shown in FIG. 12 and provided for use in conjunction with the two-pour technique. For example, FIGS. 13 through **13*b* show invert forming apparatus 300 similar to that shown in FIGS. 6 and 11 and comprised of invert defining members 302 and 304 having planar top surfaces 302*a*, 304*a*; substantially semicylindrical invert forming surfaces 302*b*, 304*b*; elongated projections 302*c*, 304*c*; and recess forming flanges 304*d*, 304*d*. The invert forming members 302 and 304 are preferably hollow. Noting, for example, FIG. 13*a*, a portion of invert forming member 304 is shown therein and is provided with an open inner end 304*e*. A portion 304*a*-1 of top surface 304*a* is removed in order to accommodate the intermediate flexible coupling 306 comprised of a rugged and yet bendable material such as a rugged fabric 306*a* which is wrapped in a substantially helical fashion about a substantially helically wound wire reinforcement 306*b* to form a flexible duct having a planar top surface 306*c*and a substantially semicylindrical bottom surface 306*d*. The flexible ducting 306 is reinforced in the same manner as the flexible ducting 94 shown, for example, in FIG. 12*b* in that a D-shaped reinforcing member 308 is placed in the interior of the flexible duct 306. A strap 310 is placed along the exterior surface of the planar portion 306*d* and fastening means 312 are utilized to secure D-shaped reinforcing frame 308 and plate 310, with the planar section 306*c* of flexible ducting 306 sandwiched therebetween. FIGS. 13 through 13*b* show the manner in which the right-hand end of flexible duct 306 is positioned within the left-hand end of member 304, with clamping plate 310 being positioned within the cutaway portion 304*a*-1 of planar top 304*a*. The flexible ducting 306 is preferably force-fitting within the interior of member 304 and is further retained in place when clamping bar 314, which is arranged to engage projection 304*c* and to rest upon the top surface 304*a* of member 304 also overlies the top surface 306*c* of flexible ducting 306 and is clamped in position, as shown for example, in FIG. 13*a* so that bar 314 rests upon the surface of plate 310 and thereby serves to retain the flexible ducting 306 in position. The left-hand end of flexible ducting 306 positioned within member 302 in a similar manner, plate 316 being positioned within a cutaway portion of top surface 302*a*. The invert forming assembly 300 of FIG. 13 is utilized in conjunction with dish-shaped registration members such as, for example, the dish-shaped members 320, 322 and 324, shown in FIG. 14 as being arranged within an associated sidewall opening within manhole base 326. A threaded rod of the type shown as rod 148 in FIG. 6 extends through central openings (not shown) provided within each of the dish-shaped registration members 320, 322 and 324 and threadedly engages tapped openings (not shown) in the outer ends of members 302 and 304, which tapped openings are similar to the tapped opening 142***e*, for example, shown in FIG. 6. Clamping bars such as, for example, the clamping bar 328 is provided along the exterior surface of the manhole base sidewall 326*a* and at each sidewall opening. Fastening means, such as, for example, the fastening member 152 shown in FIG. 6 threadedly engages the aforementioned threaded rod 148 and is tightened to firmly urge each dish-shaped registration member 320, 322 and 324 against the gasket 17 (see FIG. 6) within the associated sidewall opening. FIG. 14 shows a manhole base 326 having three sidewall openings and receiving assembly 300 shown in FIG. 13 as well as an additional assembly comprised of member 32 which is substantially identical to the members 302 and 304.

A clamping bar 330 bent at the proper angular orientation is positioned upon planar surfaces 302*a* and 304*a* so that it rests against projections 302*c* and 304*c* respectively. Clamping members, which have been omitted from FIG. 13 for purposes of simplicity, are utilized to secure clamping bar 330 to projections 302*c* and 304*c*. A second clamping bar 334 which is bent at the proper angle is placed upon planar surfaces 304*a* and 332*a* of invert forming members 304 and 332 and so that it rests against projections 304*c* and 332*c*. Clamping bar 334 is likewise secured to projections 332*c* and 304*c* by suitable clamping members of the type shown, for example, in FIG. 11. The assemblies 300 and 332 shown in FIG. 14 assure formation of an invert whose longitudinal axis is in precise alignment with the center of each associated sidewall opening. Horizontal alignment of the members 302, 304 and 332 is assured by the use of the clamping bars 330 and 34, secured in place by the aforementioned clamping members such as, for example, the clamping members C9 and C10 shown in FIG. 11. When the invert forming apparatus is fully assembled, the casting material is poured into the interior of manhole base 326 to a level sufficient to form the substantially T-shaped invert (160*a*, 160*b*, 160*c*—see FIG. 10) defined by members 302, 304 and 332. Flexible duct 306 assumes a smooth curvature and eliminates the need for removing casting material in the region between the inner ends of members 302 and 304. Thus, when an invert having three branches of the type shown in FIG. 14 is to be formed (note also FIG. 10), casting material need only be removed in the gap region G between the inner end of invert forming 332 and the adjacent sides of members 302 and 304 and flexible ducting 306. The casting material is then allowed to set. In order to expedite the setting operation, a shroud (not shown) may be placed over the base member 326 and steam of a predetermined temperature and pressure may be introduced into the shroud to elevate the temperature of the casting material thereby expediting the setting operation. During casting, operators move and shape the casting material to form sloping surfaces on opposite sides on each of the invert portions to cause any liquid falling upon said sloping surfaces to drain into the invert.

Once the casting material is set, the fasteners 152 (see FIG. 6) are removed to disassemble the invert forming assemblies which are then removed from the manhole base 326, yielding a manhole base whose invert is precisely aligned with the sidewall openings in the base member.

FIG. 15 shows still another preferred embodiment of the present invention in which the invert forming assembly 400 shown in FIG. 15 comprises a main body portion 402 having a substantially semi-cylindrical cross-section. Bell ends 404 and 406 have an enlarged diameter for forming recesses within the manhole base to provide clearance for insertion of a conduit. End surfaces 408 and 410 have a curved configuration to conform to the curved contour of the interior surface of the manhole base side wall.

The top surface 402*a* of central portion 402 and the top surfaces 404*a* and 406*a* of end portions 404 and 406 are substantially flat and coplanar. Handles 412 and 414 extend upwardly from top surfaces 404*a* and 406*a* and are secured to the internal support structures as will be more fully described. Each of the handles comprise a substantially U-shaped member having a gripping portion 412*a*, 414*a* whose integral free ends 412*b*–412*c* and 414*c*–414*d* are welded to end plates such as 424. Gripping handles 412 and 414 facilitate the handling and transportation of the invert forming assembly 400.

Each of the curved end surfaces 408, 410 are provided with a tapped opening. Note the tapped opening 410*a* provided in end surface 410 for threaded engagement with a threaded member forming part of the centering assembly to be more fully described.

Inverted angle arms 416, 418 have their outer ends secured to the upper ends of plates 420, 422 whose lower ends extend into and are anchored within the ends of body portion 402 of the invert forming assembly. Angle arms 416 and 418 act as anti-flotation arms to prevent the invert forming members from being lifted by the concrete poured into the manhole base member during the casting operation, as will be more fully described hereinbelow.

The inner ends of arms 416 and 418 are joined, preferably by welding, to a hinged pin assembly comprised of hinge arms 415*a*, 415*b* and hinge pin 415*c*. Pin 415*c* moves in the direction of arrow 415*d* when the invert form 400 is deflected to the 30° deflection angle shown by dotted line 415*e*, the right-hand portion of invert form occupying the dotted line position P relative the left-hand portion of the invert form. Movement of the right-hand portion of invert form 400 in the direction opposite that shown by arrow 415*f* causes the pin 415*c* to move in a direction opposite that shown by arrow 415*d*.

The "skin" or shell of the invert forming assembly is formed of a flexible plastic material which is preferably urethane, providing a one piece invert form which is designed to create a smooth curved, accurate channel which reduces turbulence and flow contractions that adversely limit flow capacity of the formed invert between the openings in the manhole base. The shell does not form folds or creases along the inside curve C (see FIG. 19*c*) due to deflection of the invert form. This advantageous characteristic is derived from the fact that the shell is thin enough to prevent such folding or creasing, of either a temporary or permanent nature.

The internal structure of the unitary invert forming assembly is shown best in FIG. 16. Since the opposite ends of the construction are substantially identical in design, only one of said ends has been shown in FIG. 16, for purposes of simplicity.

The internal supporting structure is comprised of a semi-circular shaped end plate 424 which end plate has a curved contour to substantially conform to the control of its adjacent end surface such as, for example, end surface 410 shown in FIG. 15.

End plate 424 is provided with an opening 424*a*, as shown in FIG. 16*a*. A hollow cylindrical member 426 has one open end 426*b* and one closed end 426*a*. The open end 426*b* extends through opening 424*a* while the closed end 426*a* projects away from the concave surface 424*a* of semi-circular plate 424. End plate 424 is also provided with a plurality of openings 424*d*. The liquid material used to form the shell enters these holes which serve to anchor the end plate 424 within the shell 402 when the shell material sets. An elongated rectangular shaped anchoring plate 422, also shown in FIG. 15, is provided with a rectangular shaped slot 422*a* extending inwardly from is right-hand edge 422*b*. Note also FIG. 16*a* which shows plate 424 and cylindrical member 426 in cross-section. The right-hand side 422*a* of plate 422 is welded to surface 424*a* of plate 424 and cylindrical member 426 is inserted within slot 422*a* and is welded to plates 422 and 424. Hollow cylindrical member 426 has its right-hand end 426*a* extending beyond the convex surface 424*c* of plate 424 and has its internal surface threaded as shown at 426*c*. Anchoring plate 422 is provided with a pair of openings for securing the angle arm 416 thereto as will be more fully described.

An elongated curved plate 428 has its right-hand end 428*a* positioned against and welded to the concave surface 424*b* of plate 424, the line of engagement being shown as dotted line 429. End 428*a* is appropriately curved or rounded to conform to the shape of concave surface 424*b*.

A pair of elongated rods 430, 432 of rectangular cross-section have their right hand ends 430*a*, 432*a* welded to the concave surface 424*b* of plate 424, the region of engagement being shown by dotted rectangles 431, 433. Two pairs of rectangular plates 434, 436 have their upper ends welded to adjacent sides 430*b*, 432*b* of rods 430, 432 and have their lower ends welded to the longitudinal sides 428*b*, 428*c* of curved plate 428. Pairs of plates 434 and 436 rigidify the supporting structure comprised of plates 424 and 428 and rods 430 and 432.

The ends 412*b*, 412*c* of handle 412 are welded to the concave surface of end plate 424.

An elongated leaf spring member 438 which is designed to flex in a direction shown by double headed arrows 439 and which is substantially inflexible and in fact rigid so as to prevent flexing in the directions shown by double headed arrows 441, which directions are perpendicular to arrows 439, is provided with a cut-away slot 438*a* at its right-hand end, said slot receiving the projecting portion of cylindrical member 426. The right-hand surface of flexible member 438 is positioned against and is welded to the left-hand surface 422*c* of anchor plate 422.

The leaf spring also acts as an anti-flotation member and further assures that the invert so formed by invert form 400 has a perfectly linear slope from the higher input opening to the lower input opening to prevent water from collecting along the invert.

A flexible conduit 440 formed of a suitable material such as for example, a coated fabric and having a helical wire 440*a* extending over its length and imbedded within the fabric cover, has its right-hand end 440*b* positioned to receive and encircle the leaf spring 438 secured to and projecting from plate 424. As can be seen in FIG. 16*b*, rods 430 and 432, curved plate 428 and reinforcing strap pairs 434, 436 encircle the right-hand end of flexible duct 440. The right-hand end of flexible duct 440 abuts against the adjacent end 422*c* of plate 422 (note also FIGS. 16 and 16*a*).

The right-hand end of flexible duct 440 is maintained in position by a pair of steel straps 442 and 444 which encircle the right-hand end of flexible duct 440 and which are provided with worm screw assemblies 442*a*, 444*a* for moving each of the free ends 442*b*, 444*b* of each steel strap relative to the opposing ends which are secured to assemblies 442*a*, 444*a*, to thereby tighten the steel straps and secure the right-hand end of flexible duct 440 to the supporting structure comprised of members 428, 430, 432, 434 and 436.

Flexible duct 440 has a length sufficient to extend substantially to the opposite end of the invert forming assembly 400 in order to be secured to the structural assembly provided at the opposite end. The structural assembly at the opposite end is substantially identical to the structural assembly of the right-hand end shown in FIG. 16 except that the left-hand end of flexible leaf spring member 438 is not welded to members 420, 424 and 426. Thus the internal structure at the left-hand end of the invert forming assembly 400 is free to be longitudinally displaced from the internal structure at the right-hand end of the invert forming assembly which has a significant advantage as will be understood when performing the casting operation as will be described more fully hereinbelow.

The flexible duct 440 significantly reduces the amount of material needed to form the shell and thus significantly reduces the overall weight of the invert form 400. The shell thickness is limited to prevent the shell from folding or creasing to when forced into a curved contour thus assuring the formation of a smooth inert of uniform cross-section throughout its length.

The internal structural assembly of the invert forming assembly is placed in a mold 450 shown in FIG. 17. Since the left and right-hand ends of the mold are substantially identical, only the right-hand end of the mold has been shown in FIG. 17 for purposes of simplicity.

The mold has a hollow substantially D-shaped central portion 452 and a pair of D-shaped end portions 454 and enlarged diameter such as end portion 454. End wall 456 is provided with opening 456*a* for receiving a threaded member, as will be more fully described. A pair of supporting brackets 458, 460 are integrally joined to the central portion 452 of the mold adjacent the upper edges 452*a*, 452*b*.

The method of molding a unitary invert forming assembly 400 is a follows:

The completed structural assembly having the configuration as shown for example in FIG. 16 is placed within mold 450 so that plate 424, for example, is received within the hollow end portion 462 of mold 450. Plate 424 is accurately positioned by insertion of a threaded member 462, having a threaded portion 462*a*, into opening 456*a* and into threaded engagement with tapped opening 426*c* in cylindrical member 426 (see FIG. 16*a*). The right-hand end of hollow cylindrical member 422*a* rests against the concave interior surface 456*a* of end 456 and is aligned so that its tapped opening 456*a* is aligned with opening 456*a*. Threaded member 462 is inserted into opening 456*a* and threadedly engages tapped opening 426*a*. When threaded member 462 is appropriately tightened so that the right-hand end of cylindrical member 426 rests against interior surface 456*a*, plate 424 and hence the entire internal structure is properly positioned within mold 450. It should be understood that the opposite end of the internal structure is inserted and properly positioned within the opposite end of the mold assembly in substantially the same fashion. Flexible duct 440 and leaf spring 438 extend through central portion 452 of mold 450.

After the invert forming assembly internal supporting structure has been inserted into and properly positioned within mold 450, bracket 464 is positioned upon the mold member so that its openings 464*a* and 464*b* are aligned with openings 458*a* and 460*a* in supporting brackets 458 and 460. Fastening members 466, 468 are used to secure the bracket 464 to supporting brackets 458, 460. Bracket 464 is provided with a pair of slender projections 464*c*, 464*d* which are integrally joined to bracket and extend downwardly therefrom. When bracket 464 is properly mounted, the lower free ends 464*c*-1, 464*d*-1 of projections 464*c* and 464*d* engage the surface of flexible duct 440 in the manner shown best in FIG. 17*a*.

After the bracket 464 has been mounted in the manner described, liquid urethane is poured into the mold in an amount so that the surface of the liquid urethane is substantially flush with the top edges 452*a*, 452*b*of mold 450. Thus, the urethane completely surrounds the internal structure, since the internal structure is designed so as to be spaced inwardly from both the sides and the top open end of the mold so that the urethane, once it is set, substantially completely surrounds the supporting structure, except for the top ends of the anchor brackets 420, 422 and handles 412, 414, to preferably form a shell around the supporting structure, said shell having a thickness in the range from 0.5 to 2.5 inches and preferably in t he range from 0.65 to 0.85 inches. In order to reduce the thickness of the shell, the flexible duct may be shaped so that its cross-section defines the letter "D". The D-shaped cross-section 440' is arranged in the mold 450 in the manner shown in FIG. 17.

Projections 464*c* and 464*d* engage the top of flexible duct 440 to hold flexible duct 440 in position and prevent the flexible duct from being lifted due to the buoyancy of the flexible duct resulting from the pouring of the liquid urethane into mold 450.

After the urethane has set, bracket 464 is removed. The projections 464*c* and 464*d* are sufficiently slender as to facilitate their removal and to have a negligible effect upon the molded urethane. As a practical matter, the urethane substantially fills the void left by the removed projections. Alternatively, liquid urethane may be placed in the voids resulting from removal of the projections 464*c*, 464*d* to avoid contamination and/or deterioration of the molded member even after long, continuous use.

The manner in which an invert is formed using the novel invert forming assembly of the present invention will now be described in connection with FIG. 18. The manhole base 480 which has previously been formed and is provided with side wall openings 480*a*, 480*b* will now have an invert formed therein by placing the invert forming assembly 400 into the interior of the manhole base. A self-centering cross 482 is inserted into side wall opening 480*b*, for example. The ends of centering cross 482 engage the side wall opening at 90° intervals. Centering pin 484 extends through an opening at the center of centering cross 482 and has a threaded end 484*a* which is inserted into opening 408*a* in bell end 408 of assembly 400. Centering pin 484 is coaxial with the center of the opening 480*b*. The bell end 408 is placed so that it is flush against the interior surface 480*c* of manhole base 480. Centering pin 484 is drawn tightly in threaded opening such as, for example, threaded opening 426*a* shown in FIG. 16*a*, drawing the invert form snugly against the interior concrete wall.

Assuming an application wherein in the openings 480*a* and 480*b* in manhole base 480 are arranged at an angle such that imaginary horizontal lines passing through the central axes of these openings form an angle of less than 180°, the right-hand end of the invert form is deflected as shown by dotted configuration 400' in FIG. 15. A centering cross and centering pin similar to that shown in FIG. 15 are inserted into opening 480*a* to maintain the invert form in the curved position shown in FIG. 18. The flexibility of the urethane shell allows the invert form to be deflected and locked at the proper angle. The one piece construction minimizes the costly labor factor during assembly of the invert form into the manhole base and the formation of the invert. The dimensional accuracy of fall and curve of the invert form is assured by use of the novel invert form thus minimizing head loss and frictional resistance. The continuity of the invert diameter, width and finish reduces turbulence and flow contractions while offering maximum flows within the formed invert.

The length of the invert is preferably slightly less than the inner diameter of the manhole base enabling the invert to be slightly stretched when the bell ends 404, 406 of the invert form are snugly urged against the interior wall 480*c* of manhoel base 480. This capability is enhanced by virtue of the fact that the flexible leaf spring member 438 (see FIG. 16) is not rigidly secured, i.e. welded to one of the end plates 424, enabling stretching of the invert form. Thus, the stretching capability of the invert form facilitates both insertion and removal of the invert form from the manhole base.

The angle arm 418 (see FIGS. 15, 16, 16*a*) is bolted to anchor plate 422 by means of threaded fasteners 419 which pass through openings 418*c*, 418*d* in vertical arm portion 418*b* of angle arm 418 and which threadedly engage one of the tapped openings 422*c* in anchor plate 422. The horizontal arm portion 418*a* of angle arm 418 rests upon the top surface 402*a* of body portion 402. The arcuate-shaped opening 418*d* allows angle arm 418 to be pivoted either clockwise or counterclockwise about the center axis of opening 418*c*, as shown by arrows 421*a*, 421*b* respectively. This angular orientation enables angle arm 418 to be adjusted to an angle which maintains the adjacent body portion at the desired angle within the manhole base. This is extremely useful in instances where the side wall openings 480*a* and 480*b*, for example, (see FIG. 18) are at different heights, necessitating the formation of an invert having a slope to facilitate the smooth flow of liquid downwardly from the higher opening to the lower opening. It should be understood that the angle arm 416 is designed to function in the identical manner.

After the invert form 400 has been placed within a manhole base in the manner described hereinabove. Concrete is poured into the manhole base to the required height and the top of the shelf is finished. The angle arms 416 and 418 serve as anti-flotation members which prevent the otherwise buoyant body portion 402 of the invert form from being lifted by the concrete due to the buoyancy of the invert form relative to the concrete poured into the manhole base. Thus, the light weight of the invert form, which contributes to its buoyancy, enhances the handling and use of the invert form while at the same time the form is prevented from being displaced upwardly by the concrete due to the use of the angle arms 416 and 418.

After the concrete reaches its initial set, invert form 400 may be removed by unscrewing the centering pins and removing them from the invert form and the manhole base. The invert form will contract somewhat to return to its normal length. The invert is easily and effortlessly removed from the manhole base due to its smooth finish and the smooth continuous curve assumed by the invert form, in the event that the form is deflected as shown, for example, in the arrangement of FIG. 18, for purposes of forming an invert of an angle other than 180°.

In the preferred embodiment, the invert form is designed to deflect approximately 25° in either direction from its normal position. For example, FIG. 19*a* shows a 180° invert. The 180° invert form 400 is capable of forming any invert between 155° and 205°.

FIG. 19*b* shows a 135° invert produced by using an invert form 400' which is made using a mold having a 135° angular configuration as shown in FIG. 19*b*. A 135° invert form designed according to the present invention is capable of forming any invert from 110° to 160°.

FIG. 19*c* shows a 90° invert 400'' which is formed using a 90° invert form. The 90° invert form is produced using an invert mold having the 90° invert shape shown in FIG. 19*c*. The invert form of FIG. 19*c* can be utilized to form inverts in the range from 65° to 115°. Thus, through the use of the three invert forms shown in FIGS. 19*a* through 19*c*, it is possible to produce every desired invert, and which inverts so formed produce a smooth, accurate channel which reduces turbulence and flow contractions that have an adverse effect upon the flow capacity.

The flexibility of the urethane shell enables the invert form to be deflected and locked to the proper angle within the manhole base by the centering assembly members 481, 484 (see FIG. 15), said angle being adjustable in both the horizontal and vertical plane. The adjustable center support ribs, i.e. angle arms, prevent flotation of the invert form during pouring operations.

FIG. 19*d* shows another invert form which is utilized to form an invert within a manhole base having three openings 480*a*, 480*b* and 480*d*. It should be understood that each of the individual arm portions 402*b*, 402*c*, 402*d* may be flexed or deflected in the horizontal direction as well as the vertical direction in the same manner as the inverts shown in FIGS. 19*a* through 19*c*.

It should further be understood that all of the invert forms of FIGS. 19*a* through 19*d* have an internal construction which is substantially similar. In the embodiment of FIG. 19*d*, two flexible leaf spring members 438 and 438' may be employed to provide the desired flexibility. The ends 438*a* and 438*a'* of flexible leaf springs 438 and 438' may be fixed to the associated end plates 424 while their opposite ends 438*b* and 438*b'* may be secured only by the steel clamps 442 and 444 shown, for example, in FIG. 16. To produce the embodiment of FIG. 19*c*, one continuous section of flexible duct 440 may be provided, for example, between openings 480*a* and 480*d*. An opening is provided at a point intermediate the ends of the flexible duct and a section of flexible duct extending through form portion 402*c* may be placed within this arm so that its first end is adjacent to the end 438*b'* of leaf spring 438 and so that its opposite end extends into the aforementioned opening formed in the continuous flexible duct section provided within the invert form portions 402*b* and 402*d*. Other than these modifications, the remaining internal construction of the invert form shown in FIG. 19*d* is substantially identical in design and operation to the internal construction of the invert forms shown in FIGS. 19*a* through 19*c*. Each of the arms of the Y-shaped invert form of FIG. 19*d* have the same flexibility and ability to be deflected as is obtained from the invert forms of FIGS. 19*a* to 19*c*.

The invert form 400 of FIG. 15 may be mounted on member 53 (see FIG. 12*c*) in place of the invert form shown in FIG. 12*c*, with one end of the invert form 400 secured to member 52 and the opposite end being flexible to assume a curved contour, when needed.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method for forming a manhole base having an invert, said method comprising the steps of:

casting a member having a base portion and an integral upright cylindrical sidewall having at least two openings therein;

providing a resilient annular gasket in each sidewall opening before casting so that a portion of each gasket is embedded in the cast member and so that a portion of each gasket is exposed;

providing a pair of substantially identical channel forming members each having a semi-cylindrical shaped surface portion whereby said channel forming members collectively define the desired channel;

placing one of a pair of positioning rings in each sidewall opening;

placing each one of said pair of substantially identical channel forming members in the interior of said cast member with one end of each of said channel forming members being positioned adjacent to but not inside of an associated one of said openings;

releasably securing the first end of each channel forming member to an associated positioning ring to axially align each channel forming member with its adjacent sidewall opening;

releasably joining the adjacent ends of said channel forming members to an alignment bar bent to conform to the desired angular orientation between said channel forming members;

pouring casting material into said interior of said manhole to a height to substantially cover said semi-cylindrical-shaped surface portion of said channel forming member and form said channel;

allowing said casting material to set;

releasing said bar from said channel forming members;

releasing each positioning ring from its associated channel forming member; and removing said channel forming members and said positioning rings from said cast member.

2. The method of claim 1 further comprising the steps of securing said alignment bar to said adjacent ends of said channel forming members by clamping to align said adjacent ends of said channel forming members.

3. The method of claim 1 further comprising providing a flexible coupling between said adjacent ends of said channel forming members to form a continuous channel portion between said openings to form a substantially curved channel wherein the angle between said channel forming members is between 45° and 180°.

4. The method of claim 1 further comprising step of heating said casting material to reduce the setting time.

5. A method for forming channels in a hollow cast member having a generally circular-shaped base portion and an integral upwardly extending cylindrical-shaped continuous sidewall having at least a pair of openings each opening having a resilient annular gasket partially embedded in said cast member, said method comprising the steps of:

placing one of a pair of locating rings in each sidewall opening;

placing a pair of substantially identical invert forming members each having a curved channel forming surface and a longitudinal axis into said hollow cast member, said longitudinal axes of said invert forming members forming an angle when said invert forming members are releasably secured to each other, with a first end of each invert forming member being adjacent an associated one of said locating rings, and positioning each of said channel forming surfaces toward said base of said cast member;

securing said first end of each invert forming member to said associated locating ring to bring said longitudinal axis of each invert forming member and the center of each locating ring and hence the center of each opening into axial alignment;

releasably securing second, inner ends of said invert forming members by a rigid elongated member to horizontally align said invert forming members, said rigid elongated member being bent at an angle conforming to said angle formed by said longitudinal axes of said invert forming members;

pouring casting material into said cast member upon said base portion and in an amount sufficient to substantially cover said curved channel forming surfaces and form said channel.

6. The method of claim 5, further comprising the steps of:

allowing said casting material to set;

disconnecting said channel forming members from their associated locating ring and said rigid member; and removing said invert forming members and locating rings from said cast member.

7. A method for producing an invert in a previously cast manhole base member having at least three openings each for receiving a conduit each opening containing an annular resilient gasket at least partially embedded in said cast member, comprising the steps of:

locating each of the three centering means in a different position occupied by each of three openings in said manhole base member, said three centering means each having centering openings;

placing a plurality of identical invert forming mold assemblies having curved surface portions defining the invert to be provided into said manhole base member, each invert forming mold assembly having a first and a second end;

said first end having an opening lying on a line substantially parallel to the longitudinal axis of the curved portion;

said second end being opposite said first end;

moving alignment members axially only through said openings and into said centering means to join and accurately align each centering means with its associated invert forming mold assembly so that said second ends of said invert forming mold assemblies are adjacent to and spaced from one another;

releasably joining the invert forming mold assemblies each to the other with at least two elongated rigid members clamped thereto to bring the invert forming mold assemblies into horizontal alignment and to prevent flotation during casting; and pouring casting material to a level sufficient to substantially cover said curved surface portions of said invert forming mold assembly for forming said invert in said manhole base member.

8. A method for forming a manhole base member comprised of a base portion and an integral cylindrical shell extending upwardly from said base portion and having openings therein the interior of said manhole base member having a channel in said base portion extending between said openings, said method comprising the steps of:

casting a hollow manhole base member having said base portion and upright sidewalls having at least two openings therein;

providing a resilient annular gasket in each opening so that at least a portion of each gasket is embedded in said cast member;

providing a pair of substantially identical channel forming members having longitudinal axes and semi-cylindrical shaped surfaces to collectively form the desired channel;

placing one of a pair of positioning rings in each opening:

placing each one of said pair of substantially identical semi-cylindrical channel forming members into said hollow cast member with one end of each of said members being positioned adjacent to but not inside of an associated one of said openings;

securing the first end of each channel forming member to an associated positioning ring to bring said longitudinal axis of each channel forming member and each portion of the channel formed by each channel forming member into axial alignment with each adjacent opening;

releasably securing the other, adjacent ends of said channel forming members each to the other; and restraining each channel forming member with a flexible member against flotation due to the casting material being poured into said manhole base member.

9. The method of claim 3 further comprising providing a flexible coupling between said adjacent ends of said channel forming members to form a continuous channel portion between said openings to form a channel wherein the angle between said channel forming members is between 45° and 180°.

10. The method of claim 8 wherein said restraining against flotation step further comprises placing an anti-flotation bar along the top surface of each channel forming member; and securing the end of each anti-flotation bar to said first end of each channel forming member engaging each sidewall opening to prevent each bar and hence its associated channel forming member from being lifted by said casting material.

11. The method of claim 8 wherein the step of restraining against flotation includes the insertion of an inflexible member in said flexible member to prevent flotation of said channel forming members and to form an invert having a linear slope while permitting said flexible member to flex and bend in a direction transverse to the flotation forces exerted upon said flexible member.

12. A method for forming channels in a hollow cast manhole base member having a generally circular-shaped base portion and an integral upwardly extending cylindrical-shaped continuous sidewall having at least a pair of openings, each having an annular resilient gasket partially embedded in said cast member, said method comprising the steps of:

placing one of a pair of locating rings in each sidewall opening;

placing a pair of identical invert forming members each having a curved channel forming surface and longitudinal axis into said hollow cast member with a first end of each invert forming member being adjacent an associated one of said locating rings and positioning said channel forming surface toward said base portion of said cast member;

securing said first end of each invert forming member to each associated locating ring to bring said longitudinal axis of each invert forming member and the center of each locating ring and hence the center of each said opening into axial alignment;

releasably securing the other, adjacent ends of each invert forming member each to the other;

pouring casting material into said cast member upon said base portion and in an amount sufficient to substantially cover said curver channel forming surfaces and form said channel; and restraining each invert forming member against flotation due to said casting material poured into said cast member.

13. The method of claim 12 wherein said restraining against flotation step further comprises placing an anti-flotation bar along the top surface of each invert forming member; and securing the end of each anti-flotation bar to said first end of each invert forming member engaging each sidewall opening to prevent each bar and hence its associated invert forming member from being lifted by said casting material.

14. The method of claim 12 further comprising providing a flexible coupling between the adjacent ends of said invert forming members to form a continuous channel portion between said openings to form a channel wherein the angle between said invert forming members is between 45° and 180°.

15. The method of claim 14 wherein the step of restraining against flotation includes the insertion of an inflexible member in said flexible coupling to prevent flotation of said invert forming members and to form an invert having a linear slope.

16. A method for producing an invert in a previously cast manhole base member having at least three openings each for receiving a conduit each opening containing a resilient annular gasket at least partially embedded in said cast member comprising the steps of:

locating one of a group of three centering means in the positions occupied by each of said openings in said manhole base member, said centering means having centering openings;

placing a plurality of identical invert forming mold assemblies having curved surface portions with longitudinal axes defining said invert to be provided, into said manhole base member, each invert forming mold assembly having a first and second end;

said first ends each having an opening lying on a line substantially parallel to said longitudinal axis of each curved portion;

said second ends being opposite said first ends.

moving alignment members axially only through said openings and into said centering means to join and accurately align each centering means with its associated invert forming mold assembly so that said second ends of said invert forming mold assemblies are adjacent to and spaced from one another;

restraining each channel forming member against flotation due to the casting material;

releasably joining said invert forming mold assemblies each to the other with at least two elongated rigid members clamped thereto to bring said invert forming mold assemblies into horizontal alignment; and pouring casting material to a level sufficient to substantially cover said curved surface portions of said invert forming mold assemblies for forming said invert in said manhole base member.

* * * * *

UNITED STATES PATENT AND TRADEMARK OFFICE
CERTIFICATE OF CORRECTION

PATENT NO. : 4,801,417

DATED : January 31, 1989

INVENTOR(S) : Jack Ditcher

It is certified that error appears in the above-identified patent and that said Letters Patent is hereby corrected as shown below:

In the Title, change "MANHOLD" to --MANHOLE--

Column 3, line 38, change "fro" to --for--

Column 6, line 35, change "case" to --cast--

Column 8, line 40, change "fashio" to --fashion--

Column 9, line 2, change "stem" to --steam--

Column 9, line 9, change "an" to --and--

Column 9, line 14, change "15, 15c" to --15, 15--

Column 11, line 32, change "28" to --82--

Column 13, line 32, change " 36'' " to -- 35'' --

Column 15, line 59, change "FIG. 5" to --FIG. 6--

UNITED STATES PATENT AND TRADEMARK OFFICE

CERTIFICATE OF CORRECTION

PATENT NO. : 4,801,417

DATED : January 31, 1989

INVENTOR(S) : Jack Ditcher

It is certified that error appears in the above-identified patent and that said Letters Patent is hereby corrected as shown below:

Column 16, line 5, change "plana" to --planar--

Column 16, line 22, change "156'" to --156a'--

Column 17, line 13, change "accomodate" to --accommodate--

Column 18, line 55, change "force-fitting" to --force-fitted--

Column 19, line 41, change "34" to --334--

Column 21, lines 3-4, change "control" to --contour--

Column 23, line 18, after "bracket" insert --464--

Column 24, line 8, delete "in"

Column 25, line 42, change "481" to --482--

Column 27, line 7, before "step" insert --the--

Column 29, line 35, change "curver" to --curved--

Signed and Sealed this

Seventh Day of May, 1991

*Attest:*

HARRY F. MANBECK, JR.

*Attesting Officer* *Commissioner of Patents and Trademarks*